(12) United States Patent
Ajichi et al.

(10) Patent No.: US 8,684,588 B2
(45) Date of Patent: Apr. 1, 2014

(54) LIGHT GUIDE ELEMENTS FOR DISPLAY DEVICE

(75) Inventors: Yuhsaku Ajichi, Osaka (JP); Takeshi Masuda, Osaka (JP); Yukihide Kohtoku, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 715 days.

(21) Appl. No.: 12/990,957

(22) PCT Filed: Feb. 20, 2009

(86) PCT No.: PCT/JP2009/053031
§ 371 (c)(1),
(2), (4) Date: Nov. 4, 2010

(87) PCT Pub. No.: WO2009/147877
PCT Pub. Date: Dec. 10, 2009

(65) Prior Publication Data
US 2011/0058125 A1  Mar. 10, 2011

(30) Foreign Application Priority Data
Jun. 4, 2008 (JP) ................................. 2008-146846

(51) Int. Cl.
*F21V 7/04* (2006.01)

(52) U.S. Cl.
USPC ...... 362/628; 362/616; 362/23.09; 362/23.16

(58) Field of Classification Search
USPC ............ 362/23.09, 23.16, 616, 628, 624, 626
See application file for complete search history.

(56) References Cited

U.S. PATENT DOCUMENTS

| | | | |
|---|---|---|---|
| 5,390,436 A * | 2/1995 | Ashall | 40/546 |
| 5,947,578 A * | 9/1999 | Ayres | 362/629 |
| 6,217,186 B1 * | 4/2001 | Fisher | 362/627 |
| 6,241,358 B1 * | 6/2001 | Higuchi et al. | 362/613 |
| 7,090,389 B2 * | 8/2006 | Parker et al. | 362/627 |
| 7,237,939 B2 * | 7/2007 | Kim et al. | 362/616 |
| 7,311,431 B2 * | 12/2007 | Chew et al. | 362/613 |
| 8,092,064 B2 * | 1/2012 | Erchak et al. | 362/613 |
| 8,199,280 B2 * | 6/2012 | Kim et al. | 349/65 |
| 8,360,592 B2 * | 1/2013 | Chung et al. | 362/97.1 |

(Continued)

FOREIGN PATENT DOCUMENTS

| | | |
|---|---|---|
| JP | 11-288611 A | 10/1999 |
| JP | 2001-312916 A | 11/2001 |

(Continued)

OTHER PUBLICATIONS

Official Communication issued in International Patent Application No. PCT/JP2009/053031, mailed on Mar. 24, 2009.

*Primary Examiner* — Ismael Negron
(74) *Attorney, Agent, or Firm* — Keating & Bennett, LLP

(57) ABSTRACT

A light guide element includes a light-emitting section including a light-emitting surface, a light guide section, and a diffusing device provided in at least part of a region extending from a boundary surface between the light-emitting section and the light guide section, to point halfway between the boundary surface and an end of the light guide section closer to the light source. The light guide element might be used to form a backlight for a liquid crystal display device.

13 Claims, 12 Drawing Sheets

(56) References Cited

U.S. PATENT DOCUMENTS

| | | |
|---|---|---|
| 2001/0017774 A1 | 8/2001 | Ito et al. |
| 2002/0197051 A1 | 12/2002 | Tamura et al. |
| 2006/0221638 A1 | 10/2006 | Chew et al. |
| 2006/0245213 A1 | 11/2006 | Beil et al. |
| 2007/0091641 A1* | 4/2007 | Lin et al. ............... 362/615 |
| 2010/0103349 A1* | 4/2010 | Schmidt et al. ........... 349/64 |
| 2010/0134718 A1 | 6/2010 | Ajichi et al. |
| 2010/0214281 A1* | 8/2010 | Ueno et al. .............. 345/214 |

FOREIGN PATENT DOCUMENTS

| | | |
|---|---|---|
| JP | 2003-043266 A | 2/2003 |
| JP | 2006-108033 A | 4/2006 |
| JP | 2006-134748 A | 5/2006 |
| JP | 2006-522436 A | 9/2006 |
| JP | 2006-286638 A | 10/2006 |
| JP | 2007-214142 A | 8/2007 |
| JP | 2009-093808 A | 4/2009 |

* cited by examiner

LIGHT GUIDE ELEMENTS FOR DISPLAY DEVICE

TECHNICAL FIELD

The present invention relates to a light guide element that is included in an illumination device to be used as backlight of a liquid crystal display device or the like, an illumination device including such a light guide element, and a liquid crystal display device including such an illumination device.

BACKGROUND ART

Liquid crystal display devices have increasingly replaced cathode-ray tube (CRT) display devices. Such liquid crystal display devices have advantages in features such as energy saving, reduced thickness, lightweight, and the like. For their advantages, the liquid crystal display devices have been widely used in liquid crystal display televisions, monitors, mobile phones, and the like. One way to utilize such advantages of the liquid crystal display devices is to improve an illumination device (so-called a backlight) provided behind a liquid crystal display device.

Illumination devices can be generally classified into a side light type (also known as edge light type) device and a direct backlight type device. The side light type device is configured such that light guide elements are provided behind a liquid crystal panel and light sources are provided at lateral edges of the respective light guide elements. In the side light type device, a light source emits light which is then reflected in a light guide element such that the liquid crystal display panel is irradiated with the light indirectly and uniformly. This configuration makes it possible to realize an illumination device having a reduced thickness and good luminance uniformity although having a low luminance. Thus, the side light type device is mainly used in a medium-to-small-size liquid crystal display of a mobile phone or a laptop personal computer.

One example of the side light type devices is disclosed in Patent Literature 1. Patent Literature 1 discloses a surface-emitting device in which a light guide plate has a reflecting surface provided with a plurality of dots so as to emit uniform light therefrom. In the surface-emitting device, the light is hardly transmitted to a corner of the reflecting surface due to a directivity of a light source, and thus, the corner of the reflecting surface becomes dark. In order to deal with this, the corner of the reflecting surface is configured with dense dots as comparing with the other area of the reflecting surface.

On the other hand, the direct backlight type device is configured such that a plurality of light sources are arranged behind a liquid crystal display panel so as to directly illuminate the liquid crystal display panel. This makes it easier for even a large screen to have a high luminance. Therefore, the direct backlight type device is mainly used in a large-size liquid crystal display of 20 inches or more. However, since currently available direct backlight type device has a thickness in a range of approximately 20 to 40 mm, this results in a barrier to a further reduction in thickness of a display.

A further reduction in thickness of a large-size liquid crystal display can be attained by placing light sources and a liquid crystal display panel closer to each other. In this case, however, it is impossible for an illumination device to have luminance uniformity unless a larger number of light sources are provided. Such an increase in the number of light sources leads to higher cost. In such circumstances, there is a demand for development of a thin illumination device in which good luminance uniformity can be obtained without providing an increased number of light sources.

Conventionally, the following attempt has been made to solve the problem. Specifically, a plurality of the illumination devices of a side light type are arranged for a reduction in thickness of a large-size liquid crystal display.

For example, Patent Literature 2 discloses a surface light-source device having a tandem structure in which plate-like light guide blocks are arranged in tandem and provided with respective light sources each for supplying primary light to corresponding one of the plate-like light guide blocks. In the surface light-source device thus structured, a wide light-emitting area can be secured by a compact configuration. Thus, the surface-light source device as disclosed in Patent Literature 2 is suitably applicable in a large-size liquid crystal display.

Patent Literature 3 discloses an illumination device including an array of light-emitting modules each having a polygonal shape. Each of the light-emitting modules includes a light source, such as LED or the like, at an end of a light emitter.

Such an illumination device as described above, configured by arranging a plurality of light-emitting units each formed by a combination of a light source and a light guide element, is called a tandem illumination device.

Regarding such a tandem illumination device as described above, it is known that each light guide element has a light guide section, in addition to a light-emitting section having a light-emitting surface, so that more uniform light can be emitted entirely from a light-emitting surface of the light guide element, and that the light guide section sufficiently diffuses light emitted from a light source into the light guide element and at the same time guides the light toward the light-emitting section (see Patent Literature 4 below).

Therefore, typical tandem light guide elements are arranged so that a light-emitting section of one of any adjacent light guide elements is on a light guide section of the other light guide element. Thus, in this structure, the light guide elements are arranged so that their respective light-emitting surfaces are continuously flush with each other.

Patent Literature 1

Japanese Patent Application Publication, Tokukai, No. 2003-43266 A (Publication Date: Feb. 13, 2003)

Patent Literature 2

Japanese Patent Application Publication, Tokukaihei, No. 11-288611 A (Publication Date: Oct. 19, 1999)

Patent Literature 3

Published Japanese translation of PCT international publication for patent application, Tokuhyo, No. 2006-522436 A (Publication Date: Sep. 28, 2006)

Patent Literature 4

Japanese Patent Application Publication, Tokukai, No. 2001-312916 A (Publication Date: Nov. 9, 2001)

SUMMARY OF INVENTION

However, because of such a structure as described above, a light guide element of the tandem structure poses such a problem that a dark area of low luminance appears near a boundary between a light guide section and a light-emitting section.

<Generation of Dark Area: Case 1>

(a) and (b) of FIG. 11 are side views showing one light guide element of such a tandem structure as disclosed in Patent Literature 4. A light guide element 100 is configured in such a way as to be divided into a light-emitting section 101 and a light guide section 102. The light-emitting section 101 and the light guide section 102 have a difference in thicknesses, and this difference in thickness results in the formation of a step at a boundary between the light-emitting section 101 and the light guide section 102. Use of this step make it is possible to place a light-emitting section 101 of another light guide element 100 on the light guide section 102 of the light guide element 100 so that their respective light-emitting surfaces are continuously flush with each other.

The light guide section 102 has its end surface facing a light source 103. Provided on a rear surface of the light-emitting section 101 opposite the light-emitting surface is a reflective sheet 104 for reflecting and diffusing light. Light from the light source 103 enters the light guide section 102 via the end surface and is guided toward the light-emitting section 101 while being totally reflected repeatedly by upper and lower surfaces of the light guide section 102. Arriving at the light-emitting section 101, the light contains various types of light such as light reflected repeatedly by upper and lower surfaces of the light-emitting section 101, light reflected by the reflective sheet 104 to be emitted from the light-emitting surface, light reflected by the reflective sheet 104 to be again totally reflected by the light-emitting surface, etc.

Among them, light entering the light-emitting surface at an angle smaller than a critical angle at which it is totally reflected, i.e., light failing to meet a total reflection condition, is emitted from the light-emitting surface.

Due to such mechanisms of light guiding and light reflection, the light emitted from the light-emitting surface in a front direction has a luminance comparatively uniform all over the light-emitting surface, as shown in (a) of FIG. 11. That is, this is how the light guide element 100 is optically designed. This makes it comparatively hard for an observer who views the light-emitting surface squarely to detect luminance unevenness of the light-emitting surface.

As shown in (b) of FIG. 11, on the other hand, an observer who views the light-emitting surface obliquely detects a dark region S1 of low luminance near the boundary between the light guide section 102 and the light-emitting section 101. As a result of their study, the inventors of the present invention consider that the occurrence of such a phenomenon is due to the fact that the light Ld, which meets the total reflection condition, keeps meeting it when directly entering the light-emitting surface after being totally reflected by the lower surface of the light guide section 102 near the boundary. As such, the light Ld is not emitted from the light-emitting surface but totally reflected, thus returning into the light-emitting section 101. This makes it impossible for the observer to detect the light Ld, thus allowing the observer to see the dark region S1.

<Generation of Dark Area: Case 2>

Further, the formation of the step between the light-emitting section 101 and the light guide section 102 results in formation of a corner region S2 in the light-emitting section 101, and this corner region S2 appears relatively dark although it is close to the light source 103. A reason for this is that at the boundary between the light-emitting section 101 and the light guide section 102, there is a dramatic change in light path due to a dramatic change in angle of inclination of the surface, and that a place of such a dramatic change in light path appears different in luminance when the light-emitting surface is viewed from a certain angle.

<Description of Means for Solving Problems as Disclosed in Patent Literature 4>

Conventionally, attempts have been made to prevent the emergence of such a shadow at a boundary.

For example, Patent Literature 4 discloses, as means for preventing such a dark region S1, a surface light source device whose light guide section has its upper or lower surface roughened. The surface light source device is described below with reference to FIG. 12.

FIG. 12 is a cross-sectional view schematically showing a surface light source device whose light guide section has its upper or lower surface roughened. The surface light source device, which is of a tandem type, includes: a fluorescent tube 111b, which serves as a light source; a reflector 112b; light guide plates 113a and 113b; a reflective sheet 114b; and a light guide section 116b having an upper surface 116e and a lower surface 116f. The light guide section 116 has its upper 116e or lower surface 116f roughened.

In the surface light source device, the light source 111b emits light which enters the light guide section 116b, which, on arriving at the upper surface 116e or the lower surface 116f of the light guide section 116b, is reflected by the roughness, and which thereby arrives at an upper surface of the light guide plate 113b at various angles of incidence. The light thus reflected diffusely is less likely to be totally reflected on arriving at the upper surface of the light guide plate 113b, and therefore passes through the upper surface of the light guide plate 113b upward. According to Patent Literature 4, such passage of light prevents the emergence of a shadow at the boundary and thereby provides a more uniform surface light source.

However, because of its configuration, the surface light source device of Patent Literature 4 poses such a problem as follows.

In the configuration taught in Patent Literature 4, the roughness of the light guide section 116b causes a decrease in luminance. A reason for this is that since the light guide section 116b has its upper 116e or lower surface 116f entirely roughened, light is reflected diffusely in the light guide section 116b and some of the light exists from the light guide section 116b without being totally reflected by the upper surface 116e or the lower surface 116f.

Such light is returned into the light guide section 116b by the reflective sheet 114b that is provided above the upper surface 116e of the light guide section 116b or below the lower surface 116f of the light guide section 116b. However, some portion of the light is absorbed by the reflective sheet 114b or the like. This absorption causes a loss in amount of light. This loss in amount of light leads to a decrease in luminance.

Furthermore, as a result of their study, the inventors of the present invention found that such an illumination device configured as described above poses such a problem as follows: if the light guide section 116b has an insufficient length, then light of the light source will emitted from the light-emitting section without sufficiently diffusing therein, resulting in that the light-emitting surface of the light guide element develops a dark portion at which the light does not arrive, thereby becoming nonuniform in light-emitting condition.

If the light guide section 116b has an insufficient length, then the light of the light source will arrive at the light-emitting section without sufficiently diffusing in the light guide section 116b (i.e., insufficiently extending over the boundary surface between the light guide section 116b and the light-emitting section 113b). A reason for this is that the light source radiates light so that on entering the light guide section, the light forms a given critical angle with an inner surface of the light guide section 116b to be totally reflected by the inner surface. A beam of light having entered the light guide element and having a given critical angle spreads radially as it travels through the light guide section. However, if the light guide section 116b has an insufficient length, then the beam of light will arrive at the light-emitting section without extending over the light guide section.

Generally, this problem is more likely to be caused in the case of use of a dot-like light source, as comparing with the case of use of a rod-like light source.

Therefore, a display device using such an illumination device as a backlight suffers from deterioration in display quality.

As a result of the study of the problem, i.e., the problem that a short length of the light guide section 116b causes nonuniformity in a light emitting state, it was found that one way to solve such a problem arising from use of the dot-like light source is to lengthen the light guide section. In this case, however, if the diffusing means is provided all over the light guide section, as in the configuration taught in Patent Literature 4, a decrease in luminance due to breaking of the total reflection condition in the light guide section becomes more serious as the light guide section is made longer.

That is, such a configuration having diffusing means provided all over a light guide section entails a decrease in luminance, and therefore cannot be applied to the configuration in which the light guide section is made longer.

Patent Literature 4 also discloses, as means to deal with a decrease in luminance of the corner region S2, a configuration in which a light guide plate has an apical end surface that is not vertical but is inclined forward as shown in FIG. 13.

However, even in such a case where the light guide plate has its apical end surface inclined, that one of any adjacent light guide plates on which the apical end surface is placed has a part where there is a dramatic change in angle of inclination of the light-emitting surface. In the presence of such a part where there is a dramatic change in angle of inclination, the light-emitting surface still suffers from a loss of uniformity in luminance.

The present invention has been made in view of the foregoing problems, and it is an object of the present invention to provide: a light guide element for allowing a dot-like light source to produce surface emission, which can suppress a decrease in luminance of the surface emission and further improve uniformity in luminance of a light-emitting surface as seen from any angle; an illumination device including such a light guide element; and a liquid crystal display device including such an illumination device and thereby having improved display quality.

In order to attain the object, a light guide element according to the present invention includes: a light-emitting section having a light-emitting surface by which to perform surface emission of light emitted from a dot-like light source; a light guide section for guiding the light emitted from the light source to the light-emitting section, the light guide section being configured so that a light-emitting section of another light guide element is placed on the light guide section; and diffusing means for diffusing incident light, the diffusing means being provided in at least part of a region extending from (i) a boundary between the light-emitting section and the light guide section to (ii) a halfway point between the boundary and that end of the light guide section which is closer to the light source.

In order to attain the object, an illumination device of the present invention includes such a light guide element.

In order to attain the object, a liquid crystal display device of the present invention includes such an illumination device as a backlight.

By the foregoing structure of the light guide element, light emitted from the light source and entering the light guide section via a light receiving surface spreads in a conical or elliptical conical shape from the light source, and arrives at an inner surface of the light guide section. The light guide section is designed so that the light emitted from the light source satisfies such a total reflection condition as to arrive at the inner surface of the light guide section at an angle of incidence larger than a critical angle, and that total reflection is repeated, i.e., that the total reflection condition is maintained. Therefore, the light emitted from the light source is totally reflected repeatedly inside of the light guide section to form a mixture of lights traveling in different directions, and then guided into the light-emitting section.

The diffusing means provided to the light guide section has a function of diffusing the incident light by reflecting it diffusely. Thus, the diffusing means causes, out of light incident at such an angle of incidence as to satisfy the total reflection condition, light that is reflected at a smaller angle. As such, part or all of the light diffused by the diffusing means no longer satisfies the total reflection condition.

Some portions of such light which no longer satisfies the total reflection condition exit the light-emitting section from the light-emitting surface, and other portions of the light leak through an upper or lower surface of the light guide section without being totally reflected inside of the light guide section 7c.

Such portions of the light that leak from the light guide section are composed of a first component and a second component. The first component is reflected back to the light guide section by a medium around the light guide section and can exit the light-emitting section from the light-emitting surface. On the other hand, the second component is absorbed by the medium. In a case where the reflective sheet is provided above the upper surface of the light guide section or below the lower surface of the light guide section, the medium around the light guide section can be the reflective sheet, an adhesive layer for attaching the reflective sheet to the light guide section, or the like. Alternatively, in a case where no such reflective sheet is provided, the medium around the light guide section can be another light guide element placed on the light guide section, air that is between the light guide section and the another light guide element, or the like.

The first component is composed of a component whose total reflection condition has been broken, and therefore can exit directly from the light-emitting surface on arriving at the light-emitting surface of the light-emitting section.

That is, the first component is a component that improves uniformity in luminance of the light-emitting surface as viewed by an observer at an oblique angle.

On the other hand, the second component is a component that is absorbed by the medium around the light guide section, and therefore causes a loss in amount of light. Thus, the second component causes a decrease in luminance of the light-emitting surface and deterioration in display quality of the liquid crystal display device.

Conventionally, a light guide section has had its upper and lower surfaces entirely roughened, without any consideration given for a decrease in luminance as would be caused by providing the light guide section with diffusing means.

That is, according to such a conventional configuration, both the first component and the second component increase at an early stage of travel of the light in the light guide section. Therefore, in comparison with a configuration in which the light guide section has neither its upper nor lower surface roughened at all, the conventional configuration can improve uniformity in luminance of the light-emitting surface as viewed by an observer at an oblique angle, but entails a significant decrease in luminance of the light-emitting surface at the same time.

In contrast, the present invention is configured such that the diffusing means is provided in at least part of the region extending from the boundary between the light-emitting section and the light guide section to the halfway point between the boundary and that end of the light guide section which is closer to the light source. According to this configuration, the first component exits directly from the light-emitting surface near the boundary and therefore brings about an effect of preventing emergence of a dark region near the boundary, and a larger reduction in the second component than in the conventional configuration brings about an effect of suppressing a loss in amount of light.

With the configuration, it is therefore possible to provide: the light guide element for allowing the light source to produce surface emission, which can suppress the decrease in luminance of the surface emission and further improve the uniformity in luminance of the light-emitting surface as seen from any angle; and the illumination device including such a light guide element. Further, it is possible to realize the liquid crystal display device including such an illumination device and thereby having improved display quality.

It is preferable that the light guide element of the present invention be configured such that: the light guide element has a thickness direction perpendicular to a extending plane of a substrate on which the light source is provided and a length direction orthogonal to the thickness direction of the light guide element and extending from the light guide section to the light-emitting section; and assuming that there is a first plane passing through the halfway point perpendicularly to the length direction, the region is represented by Z falling within a range of:

$$0 < Z \leq (h \times \tan \Phi)/(1 - (\tan \Phi \times \tan \theta)) \quad \text{(Inequality 1)},$$

where Z is a distance from the boundary to the first plane; $\theta$ is an angle of inclination formed between the extending plane of the substrate and a rear surface of the light guide section, the rear surface of the light guide section continuing into a rear surface of the light-emitting section opposite the light-emitting surface; $\Phi$ is a total reflection critical angle of the light guide element, and h is a thickness of that end of the light guide section which is closer to the light source.

As described above, since the light guide section is configured so that a light-emitting section of an adjacent light guide element is placed on the light guide section, there is provided a step between the light-emitting surface of the light-emitting section and an upper surface of the light guide section which continues into the light-emitting surface. The step has its inner surface shaped to be convex toward the inner part of the light guide element. Therefore, a tangent plane to the convex inner surface of the step is imaginable.

The tangent plane intersects with the light-emitting surface, and also intersects with the rear surface of the light guide section at a halfway point between the boundary and the light source. Imagine a tangent plane A intersecting with the light-emitting surface at an angle equal to the critical angle with respect to a normal line to the light-emitting surface. Note that the tangent plane A intersects with the rear surface of the light guide section at a halfway point Q. In this case, light totally reflected by the rear surface of the light guide section along the tangent plane A arrives directly at the light-emitting surface, and then is totally reflected by the light-emitting surface.

On one hand, light totally reflected by the rear surface of the light guide section 7c on that side of the halfway point Q which is closer to the light-emitting section arrives directly at the light-emitting surface, and then is totally reflected by the light-emitting surface. On the other hand, light totally reflected by the rear surface of the light guide section on that side of the halfway point Q which is closer to the light source cannot arrive directly at the light-emitting surface, but continues to be totally reflected inside of the light guide section.

Thus, the halfway point Q is a limiting point at which such light is generated as to be totally reflected by the rear surface of the light guide section, to arrive directly at the light-emitting surface, and to be then totally reflected by the light-emitting surface.

If the diffusing means is provided in a range between the boundary and the halfway point Q, the diffusing means breaks the total reflection condition, with the result that a light component that arrives directly at the light-emitting surface at an angle smaller than the critical angle and such a first component as described above are generated. Such a light component whose total reflection condition has been broken is not totally reflected even on arriving at the light-emitting surface, and therefore passes through the light-emitting surface to an observer. That is, the undesirable emergence of a dark region on the rear surface of the light guide section near the boundary due to the maintenance of the total reflection condition is prevented.

By Inequality 1 in which Z is a distance between the boundary and the first plane and represents a possible range of the halfway point Q, the possible range of the halfway point Q is geometrically derived. A specific deriving method is described in detail in a section describing embodiments of the present invention.

With the configurations, it is possible to realize the light guide element, which can suppress a decrease in luminance and further improve uniformity in luminance of the light-emitting surface as seen from any angle.

Furthermore, the configuration makes it possible to minimize the size of diffusing means to be provided, thus bringing about an effect advantageous in terms of manufacturing cost.

Furthermore, it is preferable that the light guide element of the present invention be configured so that the diffusing means extends from the light-emitting section into the light guide section.

In order to achieve a further increase in uniformity in luminance of the light-emitting surface, it is preferable that the diffusing means be also provided in the light-emitting section. In this case, preferred ranges to provide the diffusing means include: a region of the light-emitting section; and a region extending from (i) the boundary between the light-emitting section and the light guide section to (ii) the halfway point between the boundary and the light receiving surface.

This can bring about an excellent effect of preventing the undesirable emergence of a dark region on the rear surface of the light guide section near the boundary and further improving the uniformity in luminance of the light-emitting surface at the same time.

The term "extend" here means that the diffusing means is provided in such a way as to extend from the light-emitting section into the light guide section, but does not exclusively mean that the diffusing means is provided in a continuous fashion. That is, it does not matter whether the diffusing means is provided in such a continuous fashion as a diffusing sheet or constituted in a discontinuous fashion by a plurality of microprisms.

The configuration makes it possible to provide the diffusing means from the light-emitting section into the light guide section in a single step of a manufacturing process. Therefore, the configuration brings about an effect of having efficient manufacture of such light guide element without bringing about an increase in the number of steps of the manufacturing process.

The light-emitting section and the light guide section can be provided with different types of diffusing means. That is, the light-emitting section can be provided with diffusing means selected from among types of diffusing means favorable for making luminance of the light-emitting surface uniform, and the light guide section can be provided with diffusing means selected from among types of diffusing means favorable for preventing undesirable emergence of a dark region on the rear surface of the light guide section.

Furthermore, it is preferable that the light guide element of the present invention be configured so that the diffusing means is a diffusing sheet.

The configuration makes it possible to easily provide the diffusing sheet as the diffusing means to the light guide element. This in turn makes it possible to easily realize the light guide element which can suppress the decrease in luminance and further improve the uniformity in luminance of the light-emitting surface as seen from any angle.

Furthermore, it is preferable that the light guide element of the present invention be configured such that the diffusing means is formed by surface roughening.

The term "surface roughening" here means, for example, that fine protrusions and recessions, prisms, or lens are formed in a surface of the light guide element. The present invention is not limited to either particular shape of asperity or particular processing means, provided that these fine protrusions and recessions, prisms, or lens can be used as the diffusing means.

By performing surface roughening in the light guide element, it is possible to easily realize the light guide element which can suppress the decrease in luminance and further improve the uniformity in luminance of the light-emitting surface as seen from any angle.

Furthermore, it is preferable that the light guide element of the present invention be configured so that the diffusing means is formed by a reflecting surface for causing the light that is guided in a region extending from the halfway point to the light source to be reflected by a different angle.

In the configuration, part of the light emitted from the light source and guided to the halfway point is reflected at a different angle by the reflecting surface. This makes it possible to generate such a component of the light which can arrive at the light-emitting surface of the light-emitting section at an angle of incidence not larger than a critical angle of total reflection of the light guide element.

Therefore, it is possible to realize the light guide element which can suppress the decrease in luminance and further improve the uniformity in luminance of the light-emitting surface as seen from any angle.

Furthermore, it is preferable that the light guide element of the present invention be configured so that the diffusing means is further provided in at least part of the light-emitting section.

According to the configuration, further diffuse reflection occurs inside the light-emitting section of the light guide element, and this brings about an effect of further improving the uniformity in luminance of the light-emitting surface.

Furthermore, it is preferable that the light guide element of the present invention be configured so that the diffusing means is provided in such a way as to vary in distribution density according to an amount of light that is emitted from the light-emitting surface.

According to the configuration, the diffusing means is provided in such a way as to vary, on the surface on which it is provided, in distribution density according to an amount of light that is emitted from the light-emitting surface. This makes it possible, for example, to provide a larger number of light diffusing means in a region where the amount of light is relatively small, and to provide a smaller number of light diffusing means in a region where the amount of light is relatively large. This brings about an effect of further improving the uniformity in luminance of the light-emitting surface of the light-emitting section of the light guide element.

Furthermore, it is preferable that the light guide element of the present invention be configured such that: the light guide element has a thickness direction perpendicular to a extending plane of a substrate on which the light source is provided and a length direction orthogonal to the thickness direction of the light guide element and extending from the light guide section to the light-emitting section; and assuming that the boundary has a boundary surface perpendicular to the length direction of the light guide element, the light guide section between the light-emitting section and the light source has a length set so that a beam of light emitted from the light source and spreading radially within the light guide element has a cross-section equal in area to or larger in area than the boundary surface when the beam of light arrives at the boundary surface.

According to the configuration, the length of the light guide section between the light source and the light-emitting section (i.e., the length of the light guide section in a direction of the light source towards the light-emitting section) is defined as described above. As such, according to Snell's law, the incident light of the light source, from an air layer to the light guide element, is refracted by the critical angle. Thus, the light can arrive at the light-emitting section without extending over the light guide element. Since light emitted from the light source will hardly arrive at the light-emitting section until the light extends over the light guide element, it is possible to prevent luminance unevenness from being caused by the co-emergence of a brighter portion at which the light arrives and a darker portion at which no light arrives on the light-emitting surface of the light guide element. Therefore, it is possible to realize the light guide element which can emit the light from the light source with increased uniformity.

Furthermore, it is preferable that the light guide element of the present invention be configured so that:

$$X < Y \qquad \text{(Inequality 2),}$$

where X is a length of the light guide section along the length direction and Y is a length of the light-emitting section along the length direction.

According to the configuration, since the length of the light guide section is less than the length of the light-emitting section in a longitudinal direction, it is thus possible to avoid a pile-up of the overlapped light guide elements when respective light guide elements are overlapped with each other in a tandem manner, and prevent an increase in thickness of the illumination device provided with the light guide elements.

Furthermore, it is preferable that the light guide element of the present invention be configured so that: the light guide element has a width direction intersecting with the length direction; assuming that the light source includes one light source provided in a central part of the light guide element along the width direction, X falls within a range of:

$$X \geq \frac{L1 \times n\sqrt{\{1-(1/n^2)\}}}{2}, \quad \text{(Inequality 3)}$$

where L1 is a length of the light guide element along the width direction and n is a refractive index of the light guide element.

In order to allow the light emitted from the light source into the light guide element to arrive at the entire boundary surface between the light-emitting section and the light guide section, it is preferred that the incident light of the light source towards the light guide element should arrive at both ends of the light guide element with respect to a width direction of the light guide element, after the light from the light source is incident to the light guide element and refracted by a critical angle within the light guide element.

According to the configuration, the lowest value of the distance X is so determined as to allow light emitted from the light source into the light guide element and refracted by the critical angle to reach both ends in the width direction of the light guide element with respect to the boundary surface between the light-emitting section and the light guide section. Thus, it is possible to allow the light emitted from the light source to the light guide element and refracted by the critical angle within the light guide element to extend over an entire area of the boundary surface between the light-emitting section and the light guide section.

Therefore, it is possible to realize the light guide element which can output, with increased uniformity, the light from the light source.

The term "critical angle" here means a maximum angle of refraction can be resulted from the incidence of light from an air layer with a lower refractive index to the light guide element with a higher refractive index (i.e., an angle of inclination with respect to a line normal to a boundary surface between the air layer and the light guide element).

For example, the air layer has a refractive index n1 smaller than a refractive index n2 of a material for the light guide element 7 (i.e., n1<n2). Thus, incident light from the air layer to the light guide element is refracted at the boundary surface between the air layer and the light guide element in a direction that is angled closer to the normal line than is an angle of inclination (angle of incidence) of the incident light with respect to the normal line. When light enters the light guide element at a maximum incident angle of 90 degrees, the light will be refracted by an angle of refraction, which is referred to as the critical angle.

Furthermore, it is preferable that the light guide element of the present invention be configured so that: the light guide element has a width direction intersecting with the length direction; assuming that the light source includes an array of plural light sources, provided in a central part of the light guide element along the width direction, which emit different colors of light, X falls within a range of:

$$X \geq \frac{(L1+L2)n\sqrt{\{1-(1/n^2)\}}}{2}, \quad \text{(Inequality 4)}$$

where L1 is a length of the light guide element along the width direction, L2 is a distance between two light sources disposed at respective ends of the array, and n is a refractive index of the light guide element.

According to the configuration, the lowest value of the distance X is so determined as to allow light emitted from one of the light sources, which is most away from one end of the light guide element, to radiate into the light guide element and then to arrive at the end of the light guide element with the light being refracted by the critical angle. In this way, for all of the plural dot-like light sources, it is possible to allow the light emitted from the light source to the light guide element and refracted by the critical angle within the light guide element to extend over an entire area of the boundary surface between the light-emitting section and the light guide section. Note that the critical angle, i.e., the angle of refraction when the light is incident to the light guide element with the maximum incident angle of 90 degrees, will be dependent on the refractive index of the light guide element, as described above.

Also, according to the above-mentioned configuration, in a case where each of the light sources includes light-emitting diodes of different colors such as red (R), green (G), blue (B), or the like, it is possible to prevent the respective colors of light from arriving at the light-emitting section without blending uniformly, and thus, it is possible for the respective colors of light to blend with each other uniformly throughout the entire boundary surface between the light-emitting section and the light guide section.

Therefore, with the above-mentioned configuration, it brings about an effect of improved uniformity of light emitted from the light-emitting surface of the light guide element, in a case where each of the light sources is composed of plural light-emitting diodes in respective colors.

That is, in the above-mentioned configuration of the light guide element, it is possible to realize a light guide element free from occurrence of unevenness in both of luminance and color, without an increase of components.

Furthermore, the light guide element of the present invention is preferably configured so that the light-emitting surface is constituted by (i) a horizontal surface facing an object to be irradiated and (ii) an inclined surface provided between the horizontal surface and the light guide section and inclined at continuously varying angles to the horizontal surface to form a curved surface at which the inclined surface is connected to the horizontal surface.

According to the foregoing configuration, by the inclined surface thus provided between the horizontal surface and the light guide section, it is possible to prevent the occurrence of unevenness in luminance of the light-emitting surface. Further, since the inclined surface is inclined at continuously varying angles to the horizontal surface to form the curved surface at which the inclined surface is connected to the horizontal surface, it is possible to prevent any dramatic change in light path between light path of light emitted from the inclined surface and light path of light emitted from the horizontal surface. This makes it possible to further reduce the occurrence of luminance unevenness all over the light-emitting surface and therefore to realize an illumination device with improved uniformity in luminance.

A combination of a feature in focused claim and a feature in another claim is not limited to a combination of a feature in focused claim and a feature in another claim from which focused claim depends. Instead, a feature in focused claim can be combined with a feature in another claim from which focused claim does not depend, provided that such a combination of features attain the object of the present invention.

For a fuller understanding of the nature and advantages of the invention, reference should be made to the ensuing detailed description taken in conjunction with the accompanying drawings.

Figure 3:
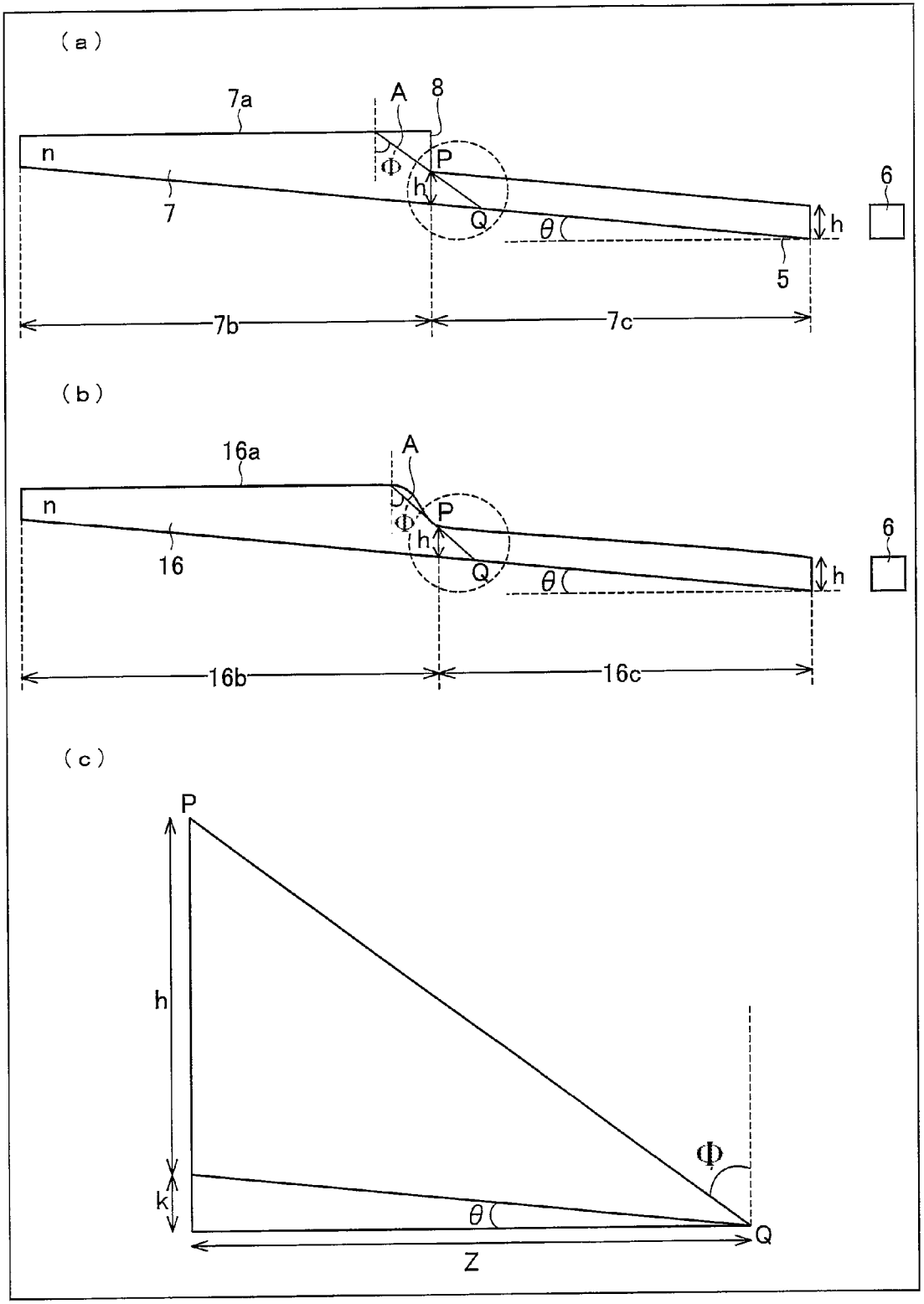

(a) through (c) of FIG. 3 are explanation views showing a position of diffusing means on a light guide element constituting the light-emitting unit. (a) and (b) of FIG. 3 schematically show a configuration of the light guide element, and (c) of FIG. 3 geometrically shows a position in which diffusing means is provided.

Figure 4:
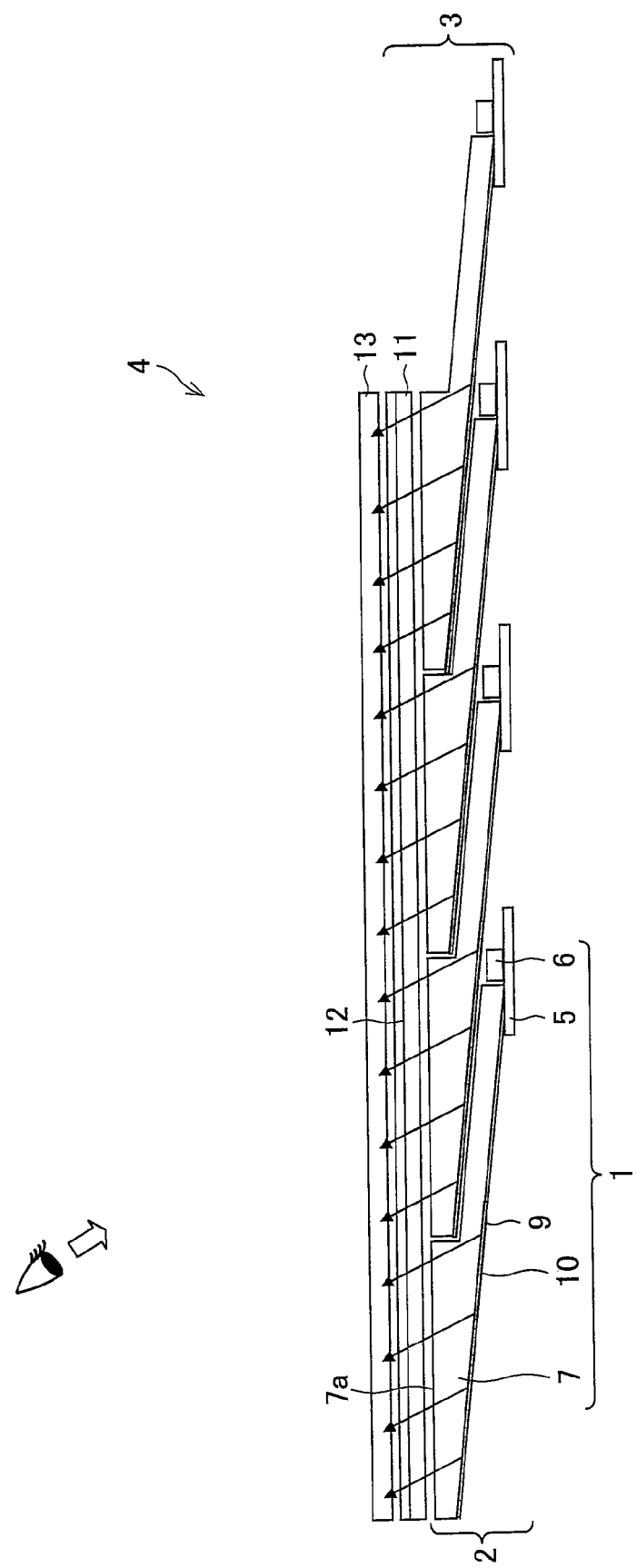

FIG. 4 is a cross-sectional view showing a configuration of the liquid crystal display device.

Figure 5:
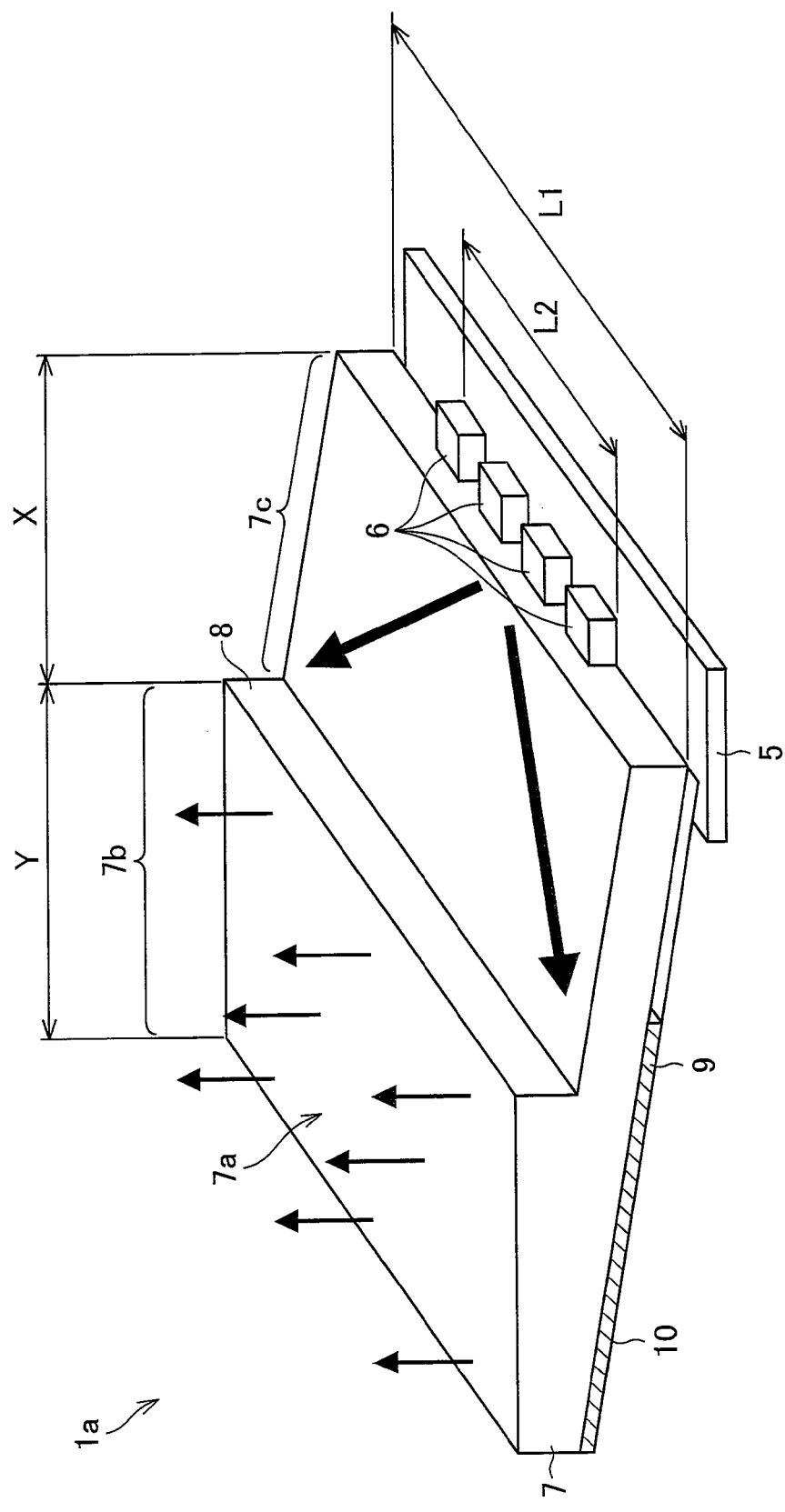

FIG. 5 is a perspective view schematically showing a configuration of a light-emitting unit constituting an illumination device of a liquid crystal display device, in accordance with another embodiment of the present invention.

Figure 6:
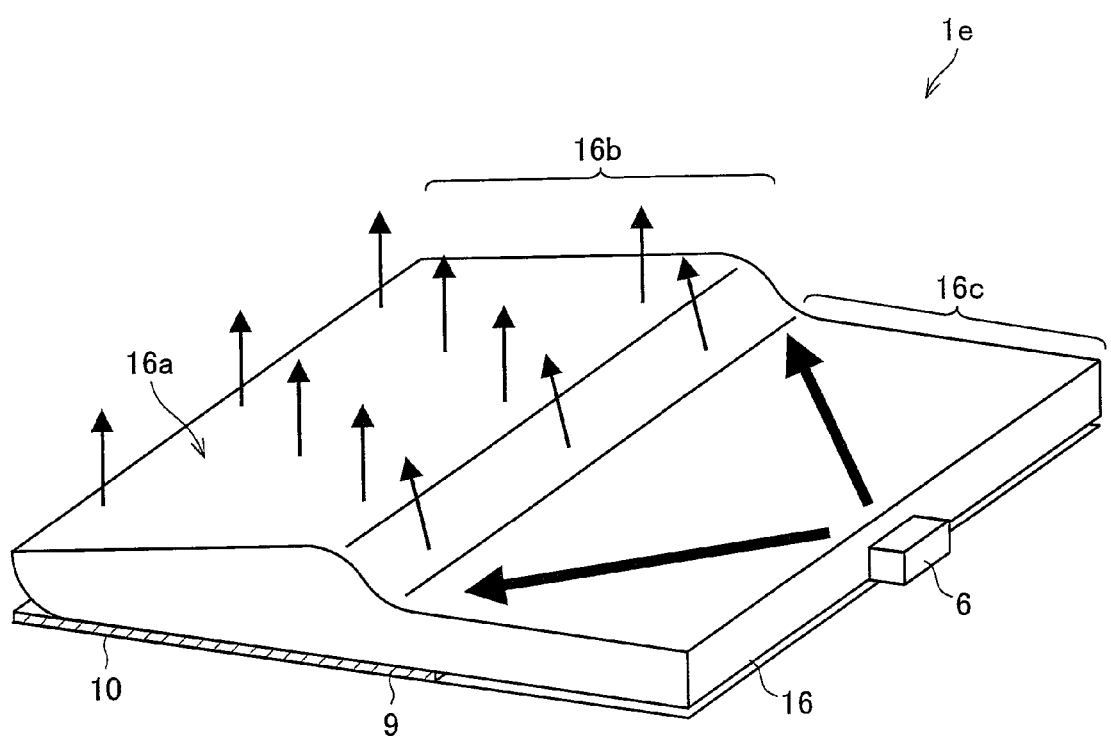

FIG. 6 is a perspective view schematically showing a modified example of the light-emitting unit of the present invention.

Figure 7:
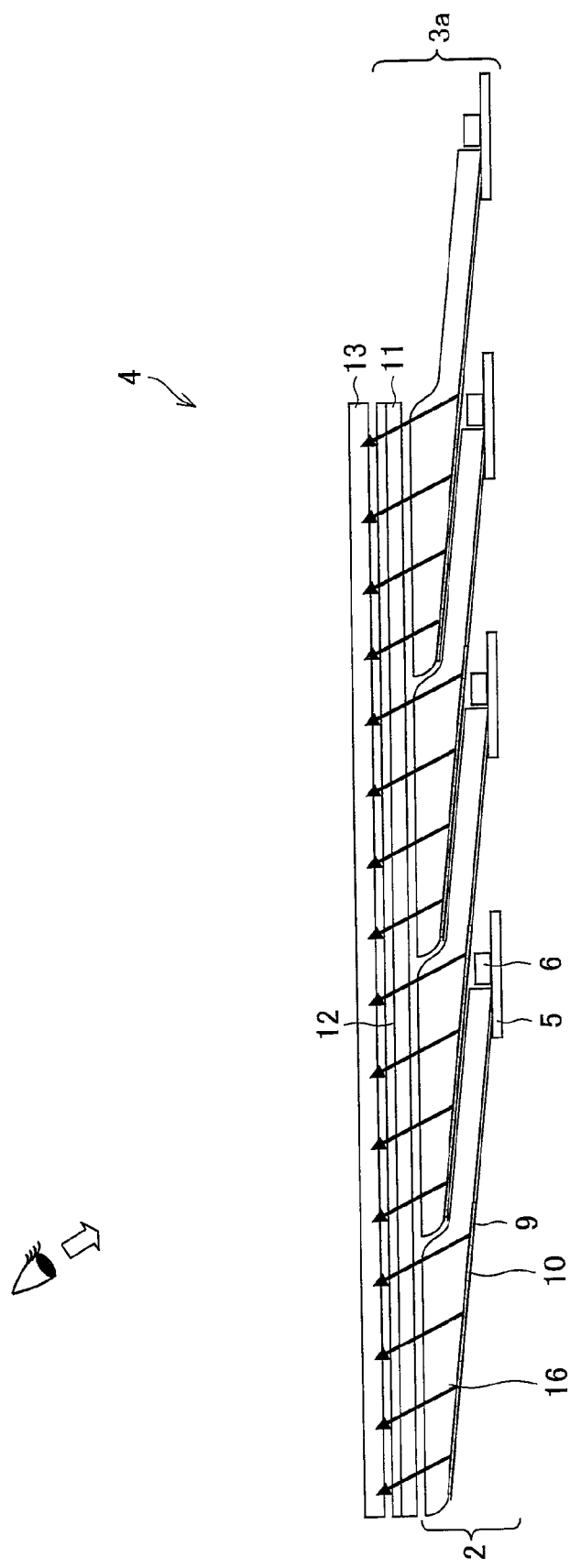

FIG. 7 is a cross-sectional view schematically showing a configuration of a liquid crystal display device which includes an illumination device including a plurality of light-emitting units as shown in FIG. 6.

Figure 8:
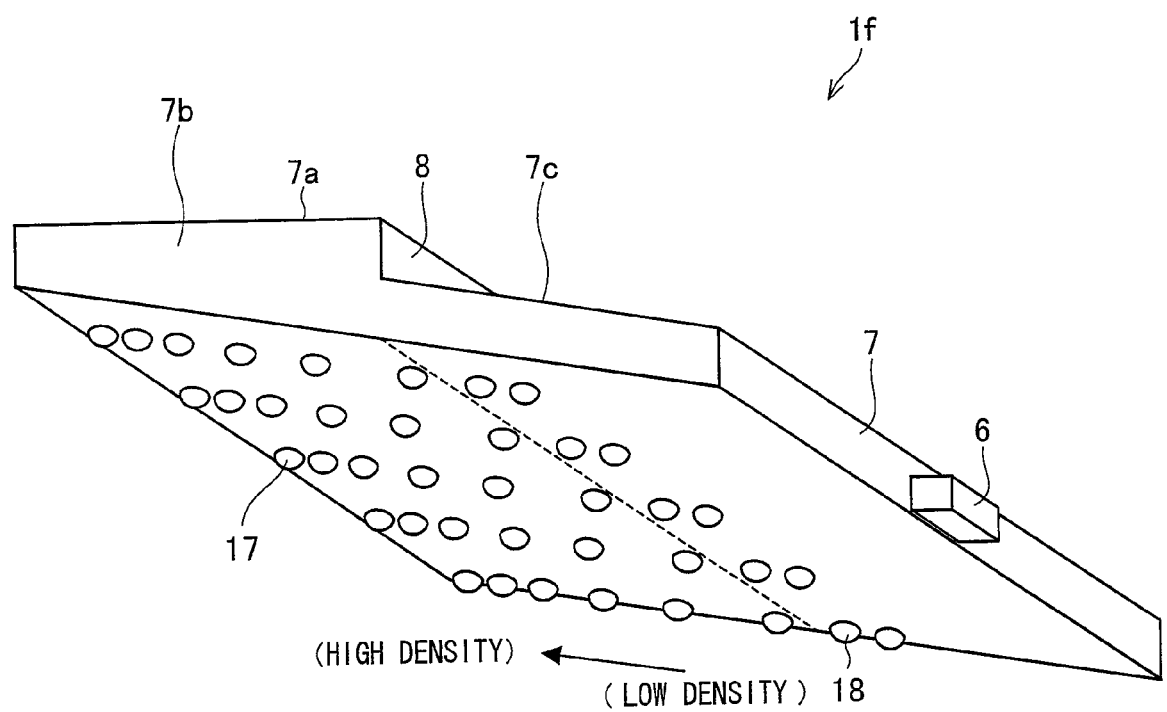

FIG. 8 is a perspective view schematically showing an example in which the diffusing means provided in the light guide element of the present invention is formed by a plurality of microprisms.

Figure 9:
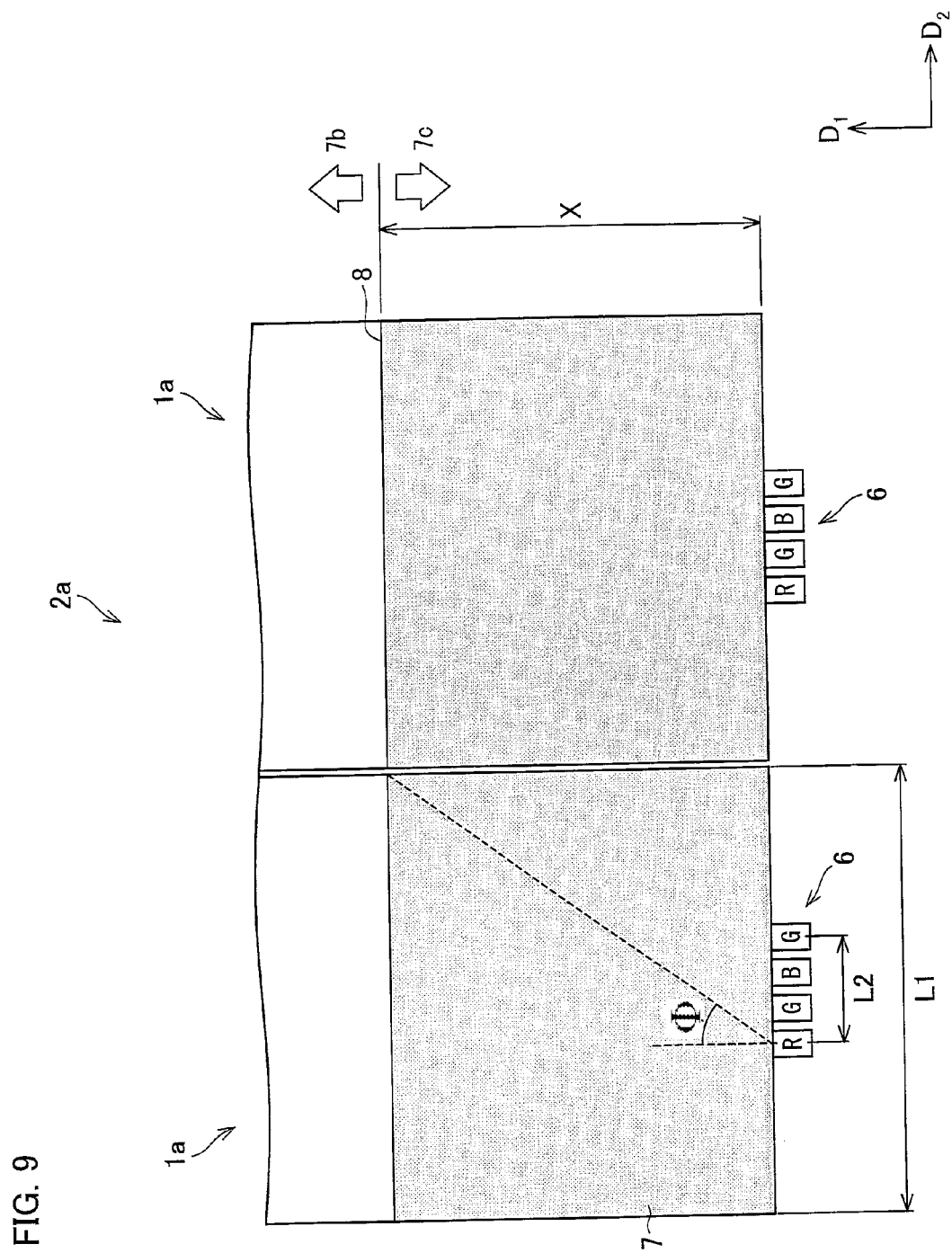

FIG. 9 is a plan view schematically showing two light guide elements and light sources each of which includes a group of LEDs, so as to illustrate a preferred length X of each light guide section according to the present invention.

Figure 10:
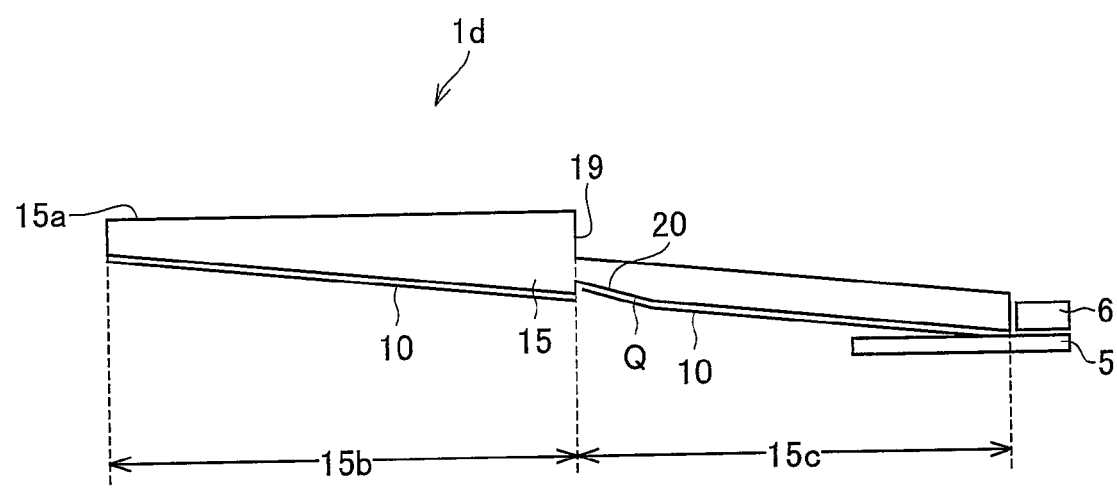

FIG. 10 is a cross-sectional view schematically showing a configuration of a light-emitting unit in accordance with still another embodiment of the present invention.

Figure 11:
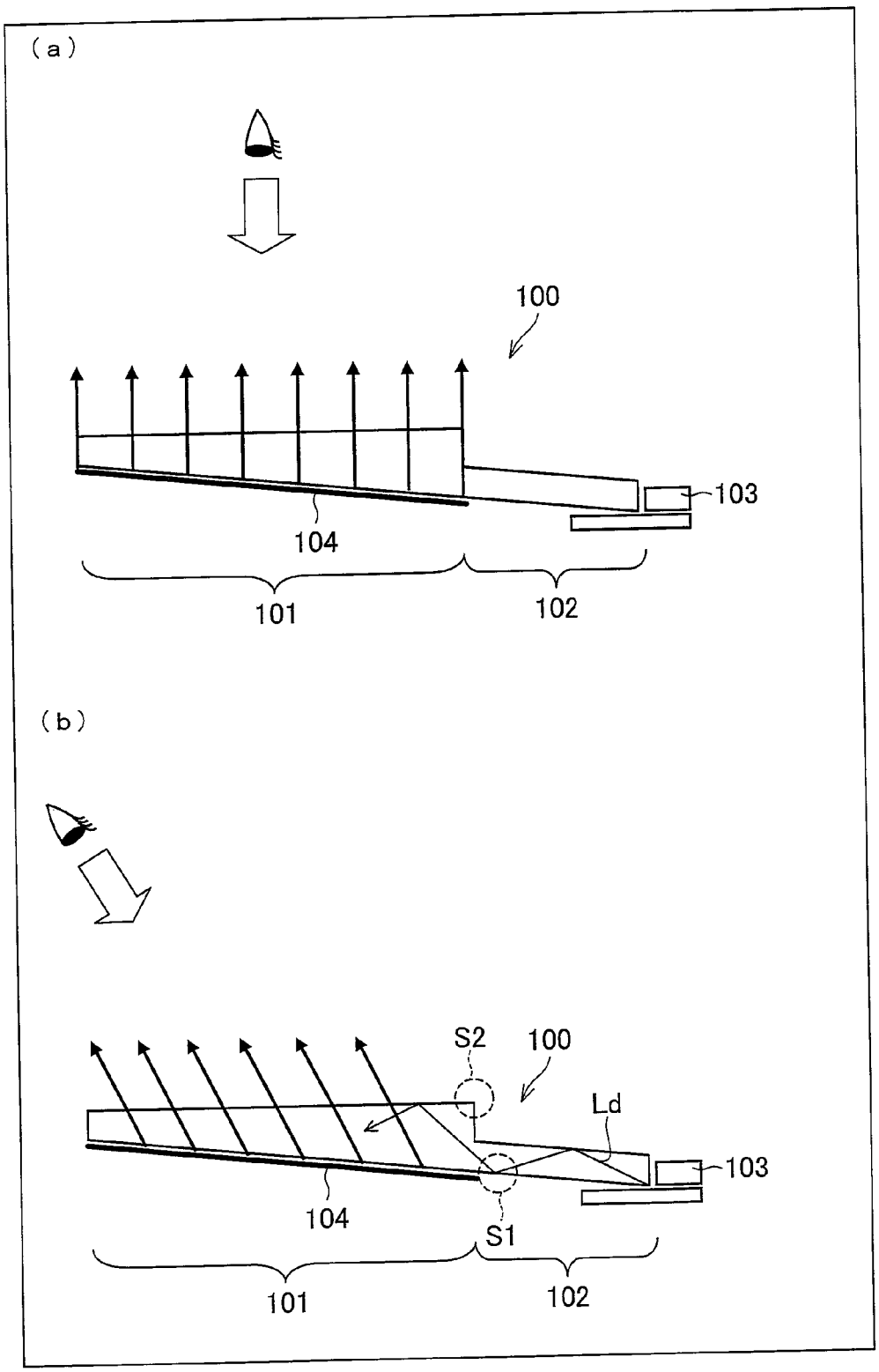

(a) and (b) of FIG. 11 are views showing a path on which light travels in a conventional tandem type of light guide element. (a) of FIG. 11 shows light emitted in a front direction from a light-emitting surface, and (b) of FIG. 11 shows light emitted in a diagonal direction from the light-emitting surface.

Figure 12:
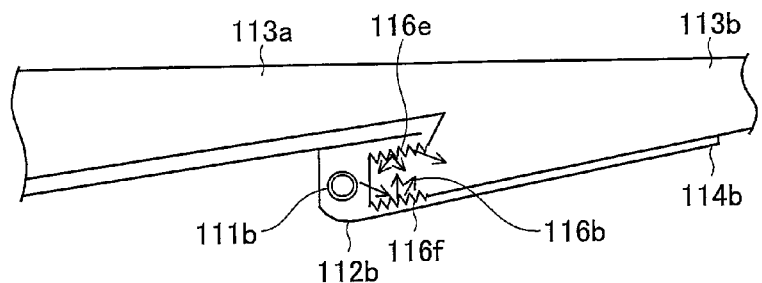

FIG. 12 is a cross-sectional view schematically showing a conventional surface light device, wherein upper and lower surfaces of the light guide element have been roughened.

Figure 13:
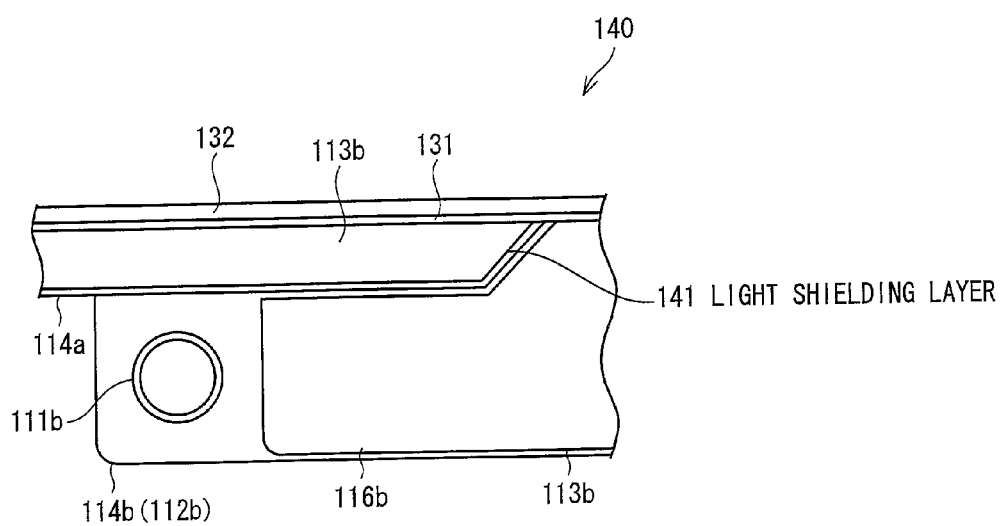

FIG. 13 is a cross-sectional view schematically showing a conventional surface light device, wherein edge surface of the light guide element is inclined forward ahead.

| Reference Signs List | |
|---|---|
| 2, 2a | Illumination device |
| 3, 3a | Backlight |
| 4 | Liquid crystal display device |
| 5 | Substrate |
| 6 | Light source |
| 7, 15, 16 | Light guide element |
| 7a, 15a, 16a | Light-emitting surface |
| 7b, 15b, 16b | Light-emitting section |
| 7c, 15c, 16c | Light guide section |
| 8 | Boundary surface |
| 9 | Diffusing means |
| 10 | Reflective sheet |
| 17, 18 | Microprism (diffusing means) |
| 20 | Reflecting surface |
| L1 | Width of light guide element |
| L2 | Distance between light source provided at one end and light source provided at the other end |
| Q | Halfway point |
| X | Length of light guide element |

| Reference Signs List | |
|---|---|
| Y | Length of light-emitting section |
| h | Thickness of light guide section of light guide element |
| θ | Angle of inclination formed between rear surface of light guide element and substrate |
| n | Refractive index of light guide element |
| Φ | Critical angle |

DESCRIPTION OF EMBODIMENTS

With reference to the drawings, the following description discusses embodiments of the present invention in detail by raising examples. However, unless otherwise noted, the scope of the invention is not limited to sizes, materials, shapes, relative positions, or the like of members discussed in embodiments. The following description is merely illustrative of the present invention.

A light guide element, an illumination device, and a liquid crystal display device according to one embodiment of the present invention are described as follows. The light guide element according to one embodiment of the present invention is a light guide element for allowing a dot-like light source to produce source emission, which can suppress a decrease in luminance of the surface emission and further improve uniformity in luminance of a light-emitting surface as seen from any angle. The illumination device according to one embodiment of the present invention includes such a light guide element. The liquid crystal distal display device of one embodiment of the present invention includes such an illumination device and thereby has improved display quality. One embodiment of the present invention is described below with reference to FIGS. 1 through 10.

Embodiment 1

FIG. 4 is a cross-sectional view showing a configuration of a liquid crystal display device according to one embodiment of the present invention.

FIG. 4 shows a configuration of a liquid crystal display device 4 including an illumination device 2 served as a backlight 3, wherein the illumination device 2 is constituted by light guide elements 7 each of which produces surface emission of light emitted from a dot-like light source 6 and on each of which a light-emitting section of another light guide element can be placed.

As shown in FIG. 4, the liquid crystal display device 4 according to one embodiment of the present invention includes a liquid crystal display panel 13 and the backlight 3, the backlight 3 placed behind the liquid crystal display panel 13 so as to irradiate the liquid crystal display panel 13 with light.

Figure 1:
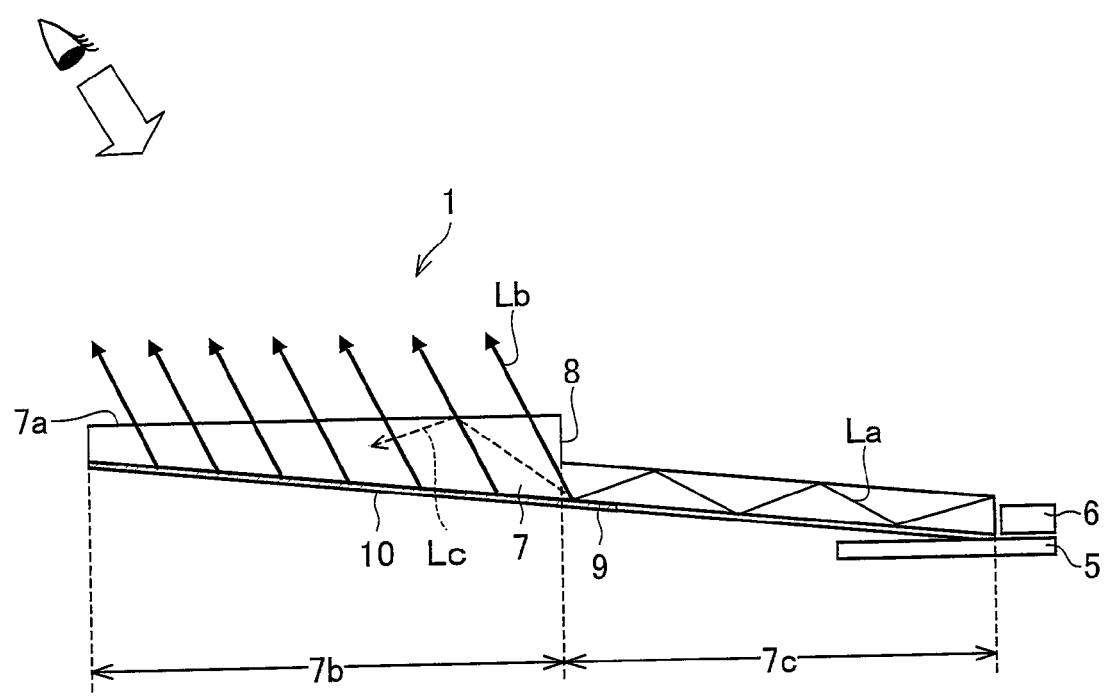
FIG. 1 is a cross-sectional view schematically showing a configuration of a light-emitting unit constituting an illumination device of a liquid crystal display device, in accordance with one embodiment of the present invention.
Figure 2:
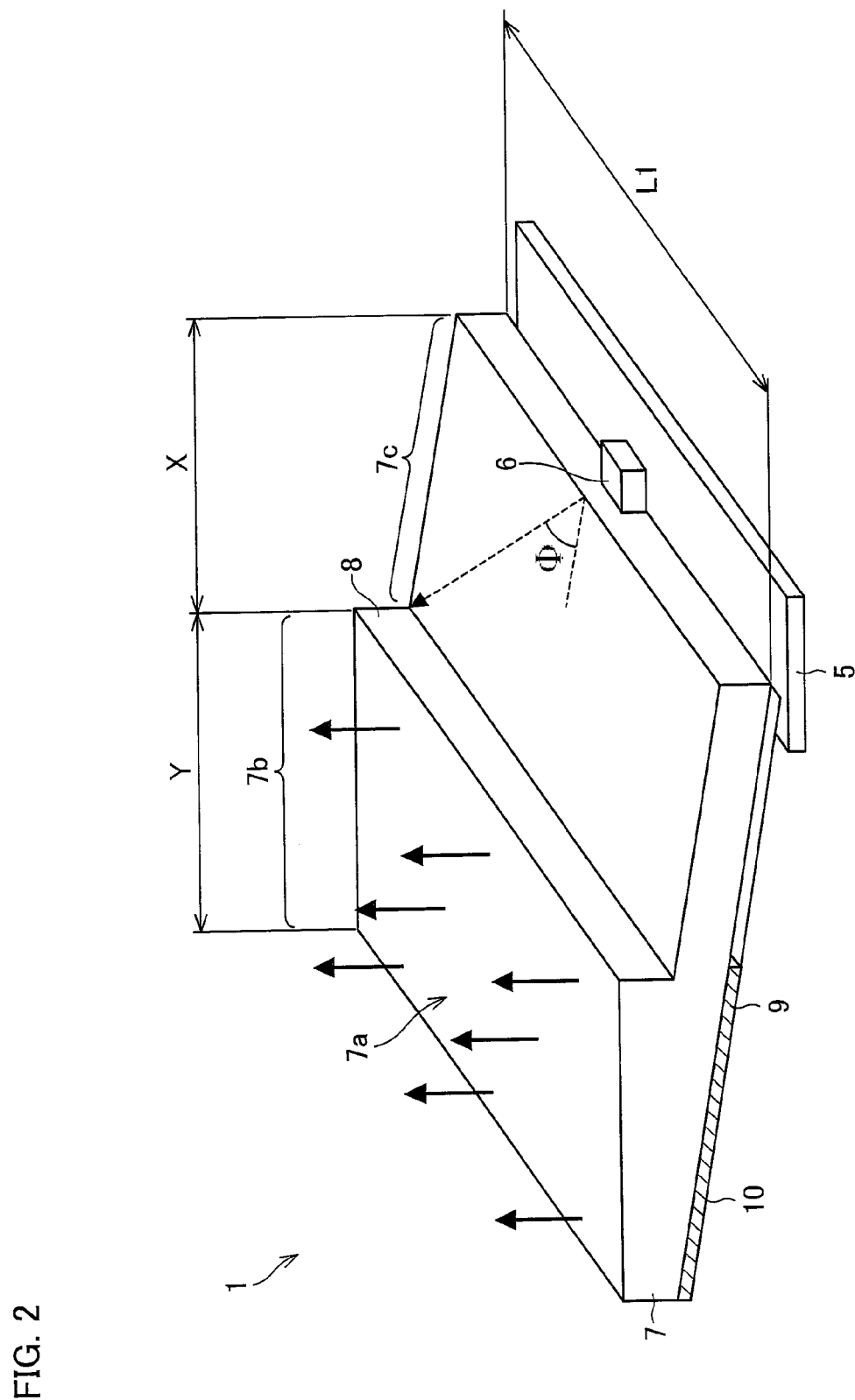
FIG. 2 is a perspective view schematically showing the configuration of the light-emitting unit.

FIG. 1 is a cross-sectional view schematically showing a configuration of a light-emitting unit 1 constituting the illumination device 2 of the liquid crystal display device 4. FIG. 2 is a perspective view schematically showing the configuration of the light-emitting unit 1.

The light-emitting unit 1 includes a substrate 5, the light source 6, the light guide element 7, diffusing means 9, and a reflective sheet 10. The light-emitting unit 1 diffuses light emitted from the light source 6, so as to produce surface emission of the light.

<Description of Light Guide Element 7>

The light guide element 7 allows the light of the light source 6 to emit outsides the light-emitting surface 7a and thus produce the surface emission. The light-emitting surface 7a is a surface, which faces the liquid crystal display panel 13 to be irradiated and irradiates the liquid crystal display panel 13 with light.

According to the present embodiment, as shown in FIGS. 1 and 2, each light guide element 7 includes: a light-emitting section 7b having a light-emitting surface 7a; and a light guide section 7c for guiding light from the light source 6 toward the light-emitting section 7b. Thickness of the light-emitting section 7b is larger than that of the light guide section 7c. Provided at a boundary between light-emitting section 7b and the light guide section 7c is a step. The light-emitting section 7b has such a shape that its thickness becomes gradually smaller with distance from the light source 6.

The light guide section 7c of the light guide element 7 is configured so that a light-emitting section 7b of another light guide element 7 can be placed on the light guide section 7c. Such a configuration allows a combination of plural light guide elements 7 to form a large flat light-emission surface.

The light guide elements 7 can be made of a transparent resin such as polycarbonate (PC), polymethyl methacrylate (PMMA), or the like. However, the present invention is not limited to this. The light guide element 7 can alternatively be made of any material of which a typical light guide element can be made. The light guide element 7 can be formed by a process such as, for example, injection molding, extrusion molding, heat-pressing molding, cutting, or the like. However, the present invention is not limited to this. The light guide element 7 can alternatively be formed by any process having a similar effect to any of the processes mentioned above.

<Description of Diffusing Means 9>

The diffusing means 9 is means for breaking the total reflection condition of light La emitted from the light source 6 and having traveled through the light guide section 7c while satisfying a total reflection condition, and for thereby producing diffuse reflection of the light La. The diffusing means 9 is provided in at least part of a region extending from a boundary surface 8 between the light-emitting section 7b and the light guide section 7c to a halfway point between the boundary surface 8 and that end of the light guide section 7c which is closer to the light source 6.

The diffused means 9 produces emission of light from that part of the light-emitting surface 7a of the light-emitting section 7b which corresponds to a shadow area (see the region S1 in (b) of FIG. 11) where there is no light emitted as seen from an oblique angle. A preferred position of the diffusing means 9 on the light guide section 7c is described later.

In order to achieve a further increase in uniformity in luminance of the light-emitting surface 7a, it is preferable that the diffusing means 9 be also provided on the light-emitting section 7b. Such a configuration produces efficient emission of light from the light-emitting surface 7a to the liquid crystal display panel 13 with more uniform luminance.

The diffusing means 9, which is provided in the light guide element 7 in the above manner, can be formed or treated by, for example, prisming by metal molding, texturing, printing, or the like. However, the present invention is not limited to this. The diffusing means 9 can be formed by employing any of the known processes as needed.

The light guide element 7 can be provided with a diffusing sheet served as the diffusing means 9.

The diffusing means 9 can extend from the light-emitting section 7b into the light guide section 7c.

The term "extend" here means that the diffusing means 9 is provided in such a way as to extend from the light-emitting section 7b into the light guide section 7c, but does not exclusively mean that the diffusing means 9 is provided in a continuous fashion. That is, it does not matter whether the diffusing means 9 is provided in such a continuous fashion as a diffusing sheet or constituted in a discontinuous fashion by a plurality of microprisms.

With foregoing configuration, it is possible to provide the diffusing means 9 from the light-emitting section 7b into the light guide section 7c in a single step of a manufacturing process. Therefore, the foregoing configuration brings about an effect of having efficient manufacture of such light guide elements 7 without bringing about an increase in the number of steps of the manufacturing process.

The light-emitting section 7b and the light guide section 7c can be provided with different types of diffusing means 9. That is, the light-emitting section 7b can be provided with diffusing means 9 selected from among types of diffusing means 9 favorable for making the luminance of the light-emitting surface 7a uniform, and the light guide section 7c can be provided with diffusing means 9 selected from among types of diffusing means 9 favorable for preventing the undesirable emergence of a dark region on a rear surface of the light guide section 7c.

<Effect Obtained by Providing Light Guide Section with Diffusing Means>

Embodiment 1 of the present invention is illustrated in detail with reference to FIGS. 1, 2, and 4.

Light emitted from the light source 6 and having entered the light guide section 7c via a light receiving surface extends to a conical or elliptical conical shape from the light source 6, and arrives at an inner surface of the light guide section 7c. The light guide section 7c is designed so that the light emitted from the light source 6 satisfies such a total reflection condition as to arrive at the inner surface of the light guide section 7c at an angle of incidence larger than a critical angle, and that total reflection is repeated, i.e., that the total reflection condition is maintained. Therefore, the light emitted from the light source 6 is totally reflected repeatedly inside of the light guide section 7 to form a mixture of lights traveling in different directions, and then guided into the light-emitting section 7b.

The diffusing means 9 provided to the light guide section 7c has a function of diffusing the incident light La by reflecting it diffusely. Thus, the diffusing means 9 causes, out of light incident at such an angle of incidence as to satisfy the total reflection condition, light Lb that is reflected at a smaller angle. As such, part or all of the light La diffused by the diffusing means 9 no longer satisfies the total reflection condition. That is, the diffusing means 9 causes a significant reduction in light Lc that is guided into the light-emitting section 7b while maintaining the total reflection condition.

Some portions of such light which no longer maintains the total reflection condition exit the light-emitting section 7b from the light-emitting surface 7a, and other portions of the light leak through an upper or lower surface of the light guide section 7c without being totally reflected inside of the light guide section 7c.

Such a portion of the light that leaks from the light guide section 7c is composed of a first component and a second component. The first component is reflected back to the light guide section 7c by a medium around the light guide section 7c and can exit the light-emitting section 7b from the light-emitting surface 7a. On the other hand, the second component is absorbed by the medium. In a case where the reflective sheet 10 is provided above or below the upper or lower surface of the light guide section 7c, the medium around the light guide section 7c can be the reflective sheet 10, an adhesive layer for attaching the reflective sheet 10 to the light guide section 7c, or the like. Alternatively, in a case where no such reflective sheet 10 is provided, the medium around the light guide section 7c can be another light guide element 7 placed on the light guide section 7c, air that is between the light guide section 7c and the another light guide element 7, or the like.

The first component is composed of a component whose total reflection condition has been broken, and therefore can exit directly from the light-emitting surface 7a on arriving at the light-emitting surface 7a of the light-emitting section 7b.

That is, the first component is a component that improves uniformity in luminance of the light-emitting surface 7a as viewed by an observer at an oblique angle.

On the other hand, the second component is a component that is absorbed by the medium around the light guide section 7c, and therefore causes a loss in amount of light. Thus, the second component causes a decrease in luminance of the light-emitting surface 7a and deterioration in display quality of the liquid crystal display device 4.

Conventionally, a light guide section has had its upper and lower surfaces entirely roughened, without any consideration given for a decrease in luminance as would be caused by providing the light guide section with diffusing means.

That is, according to such a conventional configuration, both the first component and the second component increase at an early stage of travel of the light in the light guide section. Therefore, in comparison with a configuration in which the light guide section has neither its upper nor lower surface roughened at all, the conventional configuration can improve uniformity in luminance of the light-emitting surface as viewed by an observer at an oblique angle, but entails a significant decrease in luminance of the light-emitting surface at the same time.

In contrast, the present embodiment is configured such that the diffusing means 9 is provided in at least part of the region extending from the boundary surface 8 between the light-emitting section 7b and the light guide section 7c to the halfway point between the boundary surface 8 and that end of the light guide section 7c which is closer to the light source 6. According to this configuration, the first component exits directly from the light-emitting surface 7a near the boundary surface 8 and therefore brings about an effect of preventing the emergence of a dark region near the boundary surface 8, and a larger reduction in the second component than in the conventional configuration brings about an effect of suppressing a loss in amount of light.

With the configuration according to the present embodiment, it is therefore possible to provide: the light guide element 7 for allowing the light source 6 to produce surface emission, which can suppress the decrease in luminance of the surface emission and further improve the uniformity in luminance of the light-emitting surface as seen from any angle; and the illumination device 2 including such a light guide element 7. Further, with the configuration according to the present embodiment, it is possible to realize the liquid crystal display device 4 including such an illumination device 2 and thereby having improved display quality.

<More Specific Position of Diffusion Means on Light Guide Section>

In the following, a more specific position of the diffusing means 9 on the light guide section 7c is described with reference to FIG. 3.

(a) and (b) of FIG. 3 are cross-sectional views schematically showing a configuration of the light guide element 7. (c) of FIG. 3 is an explanatory diagram geometrically showing a position in which diffusing means is provided.

As shown in (a) of FIG. 3, since the light guide section 7c is configured so that a light-emitting section 7b of an adjacent light guide element 7 is placed on the light guide section 7c, there is provided a step between the light-emitting surface 7a of the light-emitting section 7b and an upper surface of the light guide section 7c which continues into the light-emitting surface 7a. The step has its inner surface shaped to be convex toward the inner part of the light guide element 7. Therefore, there will be an imaginable tangent plane to the convex inner surface of the step.

The tangent plane intersects with the light-emitting surface 7a, and also intersects with the rear surface of the light guide section 7c (regarding a rear surface of the light-emitting section 7b as being opposite the light-emitting surface 7a) at a halfway point between the boundary surface 8 and the light source 6. Imagine a tangent plane A intersecting with the light-emitting surface 7a at an angle equal to the critical angle with respect to a normal line to the light-emitting surface 7a. Note that the tangent plane A intersects with the rear surface of the light guide section at a halfway point Q. In this case, light totally reflected by the rear surface of the light guide section 7c along the tangent plane A arrives directly at the light-emitting surface 7a, and then is totally reflected by the light-emitting surface 7a. On one hand, light totally reflected by the rear surface of the light guide section 7c on that side of the halfway point Q which is closer to the light-emitting section 7b arrives directly at the light-emitting surface 7a, and then is totally reflected by the light-emitting surface 7a. On the other hand, light totally reflected by the rear surface of the light guide section 7c on that side of the halfway point Q which is closer to the light source 6 cannot arrive directly at the light-emitting surface 7a, but continues to be totally reflected inside of the light guide section 7c.

Thus, the halfway point Q is a limiting point at which such light is generated as to be totally reflected by the rear surface of the light guide section 7c, to arrive directly at the light-emitting surface 7a, and to be then totally reflected by the light-emitting surface 7a.

Then, if a diffusing means 9 is provided in a range between the boundary surface 8 and the halfway point Q, the diffusing means 9 breaks the total reflection condition, with the result that a light component that arrives directly at the light-emitting surface 7a at an angle smaller than the critical angle and such a first component as described above are generated. Such a light component whose total reflection condition has been broken is not totally reflected even on arriving at the light-emitting surface 7a, and therefore passes through the light-emitting surface 7a to an observer. That is, the undesirable emergence of a dark region on the rear surface of the light guide section 7c near the boundary surface 8 due to the maintenance of the total reflection condition is prevented.

(b) of FIG. 3 and FIGS. 6 and 7 show a case where a light guide element 16 has a curved step portion.

The step portion of the light guide element 16 is in the shape of a gently sloping curved surface, instead of being vertical as in the case of the light guide element 7. This makes it possible to reduce the undesirable emergence of a region (see the region S2 in (b) of FIG. 11) shadowed by the boundary surface 8 blocking the light from the light source 6.

The step portion of the light guide element 16 changes in slope continuously and smoothly from an upper surface of a light guide section 16c to a light-emitting surface 16a so as not to cause a dramatic change in light path of light guided from the light guide section 16c into a light-emitting section 16b. This makes it possible to further reduce the occurrence of luminance unevenness all over the light-emitting surface 16a and therefore to realize an illumination device 2 with improved uniformity in luminance.

In the following, a method for geometrically deriving a possible range of the halfway point Q is described in detail with reference to FIG. 3.

If the light guide element 7 is made of a material having a refractive index of n, then the critical angle Φ can be given according to Snell's law as follows:

$$\sin \Phi = 1/n \quad \text{(Equation 5)}.$$

According to Equation 5, light incident to an inner surface of the light guide section 7c and the light-emitting surface 7a at an angle larger than or equal to the critical angle Φ thus derived is totally reflected and will therefore not be emitted outside the light guide element 7.

Therefore, by providing diffusing means 9, as shown in (a) and (b) of FIG. 3, so that it extends to the halfway point Q, which is a point of intersection between (i) a line drawn to form a critical angle Φ with a line normal to the light-emitting surface 7a or 16a of the light guide element 7 or 16 and (ii) the rear surface of the light guide element 7 or 16 as obtained when the line and the light guide element 7 or 16 make contact a point P on the boundary surface 8 or on the inclined surface of the light guide element 16, the light guide elements 7 and 16 are enabled to minimize a decrease in luminance and further improve uniformity in luminance of a light-emitting surface as seen from any angle.

This relationship holds true of any shape of a step portion of a light guide element other than a curved surface, provided that the point of contact P is defined.

In each of the cases of the light guide elements 7 and 16, it is possible to consider a line vertically passing through the point of contact P as a boundary line that separates the light-emitting section and the light guide section from each other.

Furthermore, a specific method for determining a range on the light guide section 7c or 16c within which the diffusing means 9 is provided is described with reference to (a) and (c) of FIG. 3.

Assuming that: the light guide element 7 has a thickness direction perpendicular to a extending plane of a substrate 5 on which the light source 6 is provided and a length direction orthogonal to the thickness direction of the light guide element and extending from the light guide section 7c to the light-emitting section 7b; 8 is an angle of inclination formed between the extending plane of the substrate 5 and a rear surface of the light guide section 7c, the rear surface of the light guide section 7c continuing into a rear surface of the light-emitting section 7b opposite the light-emitting surface 7a; Φ is a total reflection critical angle of the light guide element 7; and h is a thickness of that end of the light-emitting section 7c which is closer to the light source 6.

Since the light guide section 7c has its upper and rear surfaces formed in parallel with each other, the length of a vertical line drawn down from the point of contact P to the rear surface of the light guide element 7 or 16 is equal to the thickness h. If the vertical line drawn down from the point of contact P extends to the extending plane of the substrate 5, a right-angled triangle is formed by the following three points: (i) a point of intersection between the vertical line and the extending plane of the substrate 5, (ii) the point of contact P, and (iii) the halfway point Q.

Assuming that Z is the length of the base of the right-angled triangle, i.e., the distance between the boundary and the halfway point Q, and k is the length of a difference obtained by subtracting the thickness h from the height of the right-angled triangle. Then, Equations 6 and 7 can be derived from (c) of FIG. 3 as follows:

$$\tan \theta = k/Z \quad \text{(Equation 6); and}$$

$$\tan(90-\Phi) = (h+k)/Z \quad \text{(Equation 7)}.$$

According to Equations 6 and 7, the distance Z, which represents the range within which the diffusing means 9 is provided, can be determined.

$$Z = (h \times \tan \Phi)/((1-(\tan \Phi \times \tan \theta)) \quad \text{(Equation 8)}$$

Imagine a first plane passing through the halfway point Q perpendicularly to the length direction of the light guide element 7. Then, the distance Z can be expressed as a distance between the boundary and the first plane.

Thus, the region extending from the boundary between the light-emitting section 7b and the light guide section 7c or the boundary between the light-emitting section 16b and the light guide section 16c to the halfway point Q can be represented by the distance Z falling within a range of:

$$0 < Z \le (h \times \tan \Phi)/(1-(\tan \Phi \times \tan \theta)) \quad \text{(Inequality 1)},$$

With the configurations, it is possible to realize the light guide elements 7 and 16, which can suppress a decrease in luminance and further improve uniformity in luminance of a light-emitting surface as seen from any angle.

Furthermore, the foregoing configuration makes it possible to minimize the size of diffusing means 9 to be provided, thus bringing about an effect advantage in terms of manufacturing cost.

The liquid crystal display device 4 according to the present embodiment as described above with reference to FIG. 4 is further described below. In the present embodiment, the liquid crystal display device 4 is a transmissive liquid crystal display device 4 for performing display by transmitting light emitted from a backlight 3.

The configuration of liquid crystal display panel 13 is not limited to any specific one. Instead, it can be any one well-known configuration adapted to the current liquid crystal panels. Although not illustrated, the liquid crystal display panel 13 includes, for example, (i) an active matrix substrate having a plurality of TFTs (thin-film transistors) formed thereon, (ii) a color filter substrate opposite the active matrix substrate, and (iii) a liquid crystal layer between these substrates which is sealed by a sealing material.

An imaginable extending plane of the substrate 5, which is provided for carrying a light source 6 thereon, is served as a plane of reference in the present invention. The light-emitting surface 7a is provided in parallel with the extending plane. In order to increase luminance, it is preferable that the substrate 5 is white in color. Although not illustrated, a driver is mounted on back surface of the substrate 5 (one surface opposite to the surface on which the light source 6 is mounted), and the driver is used to control lighting of LEDs of the light source 6. That is, the driver is also mounted on the substrate 5 on which the LEDs are mounted. Via mounting the driver and LEDs on the same substrate, it is thus possible to reduce the number of substrates and the numbers of connectors and the like for connecting substrates, and therefore achieve a cost reduction. Further, since the number of substrates is decreased, it is also possible to reduce the thickness of the backlight 3.

One end of the reflective sheet 10 is sandwiched by the substrate 5 and one end of the light guide element 7, as well as the reflective sheet 10 is disposed to attach to the rear surface of the light guide element 7 (which is opposite to the light-emitting surface 7a). The reflective sheet 10 is used to reflect light so as to allow the light-emitting surface 7a to emit the light efficiently.

The diffusing plate 11 is disposed to face the respective light-emitting surfaces 7a of the light guide elements 7 with a given distance from the light-emitting surface 7a so as to entirely cover a flat light-emitting surface formed by the light-emitting surfaces 7a. The diffusing plate 11 diffuses light exited from the light-emitting surface 7a of the light guide element 7 and irradiates an optical sheet 12 (which is described later) with the diffused light. In the present embodiment, the diffusing plate 11 is "SUMIPEX E RMA10" (manufactured by Sumitomo Chemical Co, Ltd) with a thickness of 2.0 mm.

The optical sheet 12 is constituted by a plurality of optical sheets, which are disposed and stacked on the front side of each light guide element 7, and used to uniform and concentrate the light exited from the light-emitting surface 7a of the light guide element 7 so as to irradiate the liquid crystal display panel 13 with the light. The optical sheet 12 can be selected from any one of (i) a diffusing sheet for converging and scattering incident light; (ii) a lens sheet for converging incident light so as to increase luminance frontward (in the direction of the liquid crystal display panel 13); or (iii) a polarized-light reflective sheet for reflecting one of polarization components of incident light and transmitting the other polarization component as long as the luminance of the liquid crystal display device 4 can be increased. It is preferable to adopt any combination of the sheets (i) through (iii), depending on the price and/or performance of the liquid crystal display device 4. For example, the present embodiment employs "LIGHT-UP 250GM2" (manufactured by KIMOTO CO, LTD) as the diffusing sheet, and "ThickRBEF" (manufactured by Sumitomo 3M Limited) as a prism sheet, and "DBEF-D400" (manufactured by Sumitomo 3M Limited) or the like as a polarizing sheet.

As shown in FIG. 4, a structure made up of the abovementioned members will allow the light emitted from the light source 6 to travel through the light guide element 7 due to scattering and reflection, exit the light guide element 7 from the light-emitting surface 7a, and pass through the diffusing plate 11 and the optical sheet 12 so as to arrive at the liquid crystal display panel 13.

The light source 6 is provided nearby one end of the light guide section 7c which is most away from the light-emitting section 7b. The present embodiment is not limited to any particular type of light source, provided that the light source is a dot-like light source. In the present embodiment, the light source 6 is a light-emitting diode (LED) which is a dot-like source.

FIG. 5 is a perspective view schematically showing another example configuration of a light-emitting unit according to the present invention.

In a light-emitting unit 1a as shown in FIG. 5, the light source 6 includes plural types of light-emitting diode for emitting different colors of light. Specifically, the light source 6 includes an LED group that is an array of plural light-emitting diodes for emitting three different colors of light of red (R), green (G), and blue (B). It is thus possible for the light-emitting surface 7a to emit white light via the light source 6 including three colors of LEDs.

Color combinations of the light-emitting diodes can be determined as needed according to the color characteristics of the light-emitting diodes of different colors, the color characteristic of the backlight as required in accordance with a purpose for which the liquid crystal display device 4 is used, and the like. The light source 6 including the LED group is mounted on the substrate 5. The light source 6 can be a side emission type LED that has LED chips of different colors molded into a single package. This makes it possible to obtain a backlight having a wide color reproduction range.

Embodiment 2

Embodiment 2 of the present invention is described below with reference to FIGS. 2 and 9. A configuration other than that described in the present embodiment is the same as the configuration described in Embodiment 1. For convenience of explanation, members having the same functions as those shown in the drawings in Embodiment 1 are given the same reference numerals, and as such, are omitted to describe below.

<Length of Light Guide Section>

In such a case as in the illumination device 2 according to the present embodiment where a dot-like light source 6 and a light guide element 7 are combined, a beam of light emitted from the light source 6 enters the light guide element 7 and extends radially with a critical angle $\Phi$.

The term "critical angle $\Phi$" here means a maximum angle of refraction that is resulted from the incidence of light from an air layer with a lower refractive index to the light guide element with a higher refractive index (an angle of inclination with respect to a line normal to the boundary surface between the air layer and the light guide element).

For example, the air layer has a refractive index n1 smaller than a refractive index n2 of a material for the light guide element 7 (i.e., n1<n2). Thus, incident light from the air layer to the light guide element is refracted at the boundary surface between the air layer and the light guide element and inclined to the normal line, as comparing with an angle of inclination of the incident light with respect to the normal line (i.e. angle of incidence). When light enters the light guide element with a maximum incident angle of 90 degrees, the light will be refracted by an angle of refraction, which is referred to as the critical angle $\Phi$.

That is, in the present embodiment, an emitted beam of light from the light source 6 disposed in the air layer extends radially with the critical angle $\Phi$ within the light guide element 7. Based on a refractive index n of the material constituting the light guide element 7, the critical angle $\Phi$, that is defined in the light guide element 7's side with respect to the boundary surface between the air layer and the light guide element 7, can be determined according to Snell's law.

The light guide section 7c of the light guide element 7 will allow a beam of light refracted by the critical angle $\Phi$ within the light guide element 7 to extend throughout the light guide element before arriving at the light-emitting section 7b.

However, a conventional illumination device will suffer from a problem as described below due to failure of definition in the length of a light guide section.

This problem is described in detail below with reference to FIG. 9.

FIG. 9 is a plan view schematically showing two light guide elements 7 and light sources 6 each including a group of LEDs, so as to explain a preferred length of each light guide section 7c.

See FIG. 9, conventionally, since the length of each light guide section 7c (or specifically, the length X of each light guide section 7c in a direction D1 from the light source 6 towards the light-emitting section 7b) fails to be defined, and thus, if the length of each light guide section 7c is less than a predetermined length, the light that is refracted by the critical angle $\Phi$ within the light guide element 7 will arrive at the light-emitting section 7b without extending over the full width of the light guide element 7. This causes the light-emitting surface 7a of the light guide element 7 to have dark portions at both ends in a width direction D2 of the light guide element 7. These dark portions cause nonuniformity in emitting state. A display device including such an illumination device as a backlight ends up with deterioration in display quality.

Further, especially when the light source 6 includes an LED group that is an array of plural light-emitting diodes for emitting three colors of light of red (R), green (G), and blue (B), the light guide section 7c also serves as a color-blending area where these colors of light are blended so that the light-emitting surface 7a emits white light. However, if the length of each light guide section 7c (color-blending area) in such an illumination device is too short, these colors of light may not be completely blended, resulting in that the respective colors of light are emitted from the light-emitting surface 7a of the light-emitting section 7b separately and occurrence of luminance unevenness.

In view of this, in the present embodiment, the length X of the light guide section 7c between the light source 6 and the light-emitting section 7b is set so that a beam of light emitted from the light source 6 and extending radially within the light guide element 7 has a cross-section equal in area to or larger in area than the boundary surface when the beam of light arrives at the boundary surface.

By defining the length X of the light guide section 7c as above-mentioned, light refracted by a given critical angle $\Phi$ within the light guide element 7 can be prevented from arriving at the light-emitting section 7b without extending throughout the light guide element 7. This makes it possible to prevent luminance unevenness from being caused by the co-emergence of a brighter portion at which the light arrives and a darker portion at which no light arrives on the light-emitting surface 7a of the light guide element 7.

Furthermore, in the present embodiment as shown in FIG. 2, assuming that Y is the length of the light-emitting section 7b in the length direction of the light guide element 7, then the length X of the light guide section 7c and the length Y of the light-emitting section 7b should satisfy the following relationships:

$$X < Y \qquad \text{(Inequality 2)}.$$

That is, in each light guide element 7, since the length X of the light guide section 7c is less than the length Y of the light-emitting section 7b, it is thus possible to avoid a pile-up of the overlapped light guide elements when respective light guide elements are overlapped with each other in a tandem manner, and prevent an increase in thickness of the illumination device 2.

The following describes such a case of the present embodiment where each light guide element 7 is provided with one LED as a light source 6. FIG. 2 shows a structure of a light-emitting unit 1 in which each light guide element 7 is provided with one LED as a light source 6.

In the light-emitting unit 1 as shown in FIG. 1, each light guide element 7 is provided with one white LED as a light source 6 at an end of the light guide section 7c. The light source 6 composed of one white LED is located in a central part of the light guide element 7 along the length L1 of the light guide element 7 in the width direction. This makes it possible to set the length X of the light guide section 7c shorter than in a case where the light source 6 is placed closer to one of the two ends of the light guide element 7 in the width direction.

In the following, a specific method for determining a lowest value of the length X of the light guide section 7c is described.

In such a case where the light source 6 is solely composed of one LED, the light source 6 should emit light into the light guide element 7 in such a manner that those portions of the light which have been refracted by the critical angle $\Phi$ on entering the light guide element 7 arrive at both ends of the light guide element 7 in the width direction by the time they arrive at the boundary surface 8. This allows the light emitted from the light source 6 into the light guide element 7 to arrive at the entire boundary surface 8 between the light-emitting section 7b and the light guide section 7c.

The lowest value of the distance X is so determined as to satisfy the above-described condition, that is, such a distance will allow the light emitted from the light source 6 into the light guide element 7 and refracted by the critical angle $\Phi$ to reach both ends of the light guide element 7 in the width direction, with respect to the boundary surface 8 between the light-emitting section 7b and the light guide section 7c.

The lowest value of X is such a value of X as to satisfy Equation a as follows:

$$\tan \Phi = (L\tfrac{1}{2})/X = L\tfrac{1}{2}X \qquad \text{(Equation a)}.$$

According to Snell' Law, $$\sin \Phi = 1/n \qquad \text{(Equation b)}.$$

Further, according to a trigonometric Equation, $$\tan\phi = \frac{\sin\phi}{\sqrt{(1 - \sin^2\phi)}}. \qquad \text{(Equation c)}$$

According to the Equations a through c, the lowest value of X is such a value as to satisfy Equation d as follows:

$$L1/2X = \frac{1}{n\sqrt{\{1 - (1/n^2)\}}} \qquad \text{(Equation d)}$$

$$X = \frac{L1 \times n\sqrt{\{1 - (1/n^2)\}}}{2}.$$

Therefore, it is preferable that the distance X satisfy Inequality 3 as follows:

$$X \geq \frac{L1 \times n\sqrt{\{1 - (1/n^2)\}}}{2}. \qquad \text{(Inequality 3)}$$

Thus, a preferred range of the length X of the light guide section 7c is defined by Inequality 3, based on Snell's law, the light emitted from the light source 6 into the light guide element 7 via the air layer is refracted by the critical angle $\Phi$. The critical angle $\Phi$ is a value determined by the refractive index n of a material of which the light guide element 7 is made.

If the illumination device 2 is made up of a combination of the above-described light-emitting units 1, it will be possible for the light, which is emitted by any of the plural dot-like light sources towards the light guide element and refracted by the critical angle within the light guide element, to extend over an entire area of the boundary surface between the light-emitting section and the light guide section.

The following describes such a case of the present embodiment where each light guide element 7 is provided with a plurality of LEDs as a light source 6. FIG. 9 is a plan view schematically showing two light guide elements 7 and light sources 6 each including a group of LEDs, so as to explain a preferred length X of each light guide section 7c.

FIG. 9 shows the two light guide elements 7 arranged in the width direction D2 in an illumination device 2a. In the example shown in FIG. 9, each light source 6 includes a group of LEDs that is an array of a red LED (R-LED), a green LED (G-LED), a blue LED (B-LED), and another green LED (G-LED) that are arranged in this order in the width direction D2 at an end of the corresponding light guide element. Each light guide element is provided with such a light source 6 including a group of LEDs.

In each light source 6, L2 is the distance between two LEDs (R-LED and G-LED in FIG. 9) provided at respective ends of the group of LEDs along an array direction. In each light guide element 7, L1 is the length of the light guide element 7 in the width direction D2, and n is the refractive index of the light guide element 7. According to Snell's Law, light emitted from the light source 6 into the light guide element via an air layer is refracted by a critical angle Φ, as described earlier.

In the configuration, the light source 6 should emit the light into the light guide element 7 in such a manner that those portions of the light which have been refracted by the critical angle Φ on entering the light guide element 7 arrive at ends of the light guide element 7 in the width direction D2 by the time they arrive at the boundary surface 8. This allows the light emitted from the light source 6 into the light guide element 7 to arrive at the entire boundary surface 8 between the light-emitting section 7b and the light guide section 7c.

The lowest value of the distance X as to satisfy the condition is such a distance that light (i) emitted from that one of the LEDs of the light source 6 which is furthest from one end of the light guide element 7 and (ii) refracted by the critical angle Φ on entering the light guide element 7 arrives at the end of the light guide element at the boundary surface 8. That is, in FIG. 10, the lowest value of the distance X should be determined by a distance set so that light emitted from the leftmost LED (i.e., R-LED) and refracted by the critical angle Φ on entering the light guide element 7 arrives at one end of the light guide element 7 at the boundary surface 8 between the light-emitting section 7b and the light guide section 7c, as indicated by a dashed line.

The lowest value of X is such a value of X as to satisfy Equation a-1 as follows:

$$\tan \Phi = ((L1+L2)/2)/X = (L1+L2)/2X \quad \text{(Equation a-1)}$$

According to Snell's law, $$\sin \Phi = 1/n \quad \text{(Equation b)}$$

Further, according to a trigonometric Equation, $$\tan\phi = \frac{\sin\phi}{\sqrt{(1-\sin^2\phi)}}. \quad \text{(Equation c)}$$

According to the Equations a-1, b, and c, the lowest value of X is such a value as to satisfy Equation d-1 as follows:

$$(L1+L2)/2X = \frac{1}{n\sqrt{\{1-(1/n^2)\}}} \quad \text{(Equation d-1)}$$

-continued $$X = \frac{(L1+L2)n\sqrt{\{1-(1/n^2)\}}}{2}.$$

Therefore, it is preferable that the distance X satisfy Inequality 4 as follows:

$$X \geq \frac{(L1+L2)n\sqrt{\{1-(1/n^2)\}}}{2}. \quad \text{(Inequality 4)}$$

In a case where Inequality 4 is satisfied, the light source 6 is located in a central part of the light guide element 7 along the length L1 of the light guide element 7 in the width direction D2. This makes it possible the length X of the light guide section 7c shorter than in a case where the light source 6 is placed closer to one of the two ends of the light guide element 7 in the width direction D2.

Thus, a preferred range of the length X of the light guide section 7c is determined by Inequality 4, based on the fact that according to Snell' law, the light emitted from the light source 6 into the light guide element via the air layer is refracted by the critical angle Φ. The critical angle Φ is a value determined by the refractive index n of a material of which the light guide element 7 is made up.

In a case where the light guide element 7 is made of polycarbonate, for example, the refractive index n is 1.59 and the critical angle Φ is 38 degrees. In a case where the light guide element 7 is made of PMMA, on the other hand, the refractive index n is 1.49 and the critical angle Φ is 42 degrees.

The following description discusses one example of a specific range of the distance X of the light guide section 7c. For example, in a case where (i) the light guide element 7 is made of polycarbonate, (ii) the size L1 of the light guide element 7 along the width direction D2 is 24 mm, and (iii) the distance L2 between the two LEDs at the respective ends of the group of LEDs of the light source 6 is 3 mm, X is 16.6 mm or longer. In this case, if a distance Y of the light-emitting section 7b is 27 mm, for example, an upper limit of the distance X should be less than 27 mm. In a light-emitting unit 1a having members with such dimensions, the distance X of the light guide section 7c can be, for example, 25 mm.

If the illumination device 2a is made up of a combination of the above-described light-emitting units 1a, it will be possible for the light, which is emitted by any of the plural dot-like light sources towards the light guide element and refracted by the critical angle within the light guide element, to extend over an entire area of the boundary surface between the light-emitting section and the light guide section. Further, in a case where each of the light sources includes light-emitting diodes of different colors, it is possible to prevent the respective colors of light from arriving at the light-emitting section without blending uniformly, and thus, it is possible for the respective colors of light to blend with each other uniformly throughout the entire boundary surface between the light-emitting section and the light guide section.

Moreover, according to the above configuration, since the length X of the light guide section 7c is less than the length Y of the light-emitting section 7b, it is thus possible to avoid a pile-up of the overlapped light guide elements when respective light guide elements are overlapped with each other in a tandem manner, and prevent an increase in thickness of the illumination device 2.

Embodiment 3

Embodiment 3 of the present invention is described below with reference to FIG. 8. A configuration other than that described in the present embodiment is the same as the configuration described in Embodiment 1. For convenience of explanation, members having the same functions as those shown in the drawings in Embodiment 1 are given the same reference numerals, and as such, are omitted to describe below.

FIG. 8 is a perspective view schematically showing a configuration of a light-emitting unit constituting an illumination device of a liquid crystal display device according to another embodiment of the present invention.

As shown in FIG. 8, the light guide element 7 has a plurality of microprisms (diffusing means) 17 and 18 provided on a surface of the light-emitting surface 7a opposite the light-emitting section 7b so as to diffuse light emitted from the light guide element 7. The microprisms 17 are provided on a rear surface of the light-emitting section 7b opposite the light-emitting surface. The microprisms 18 are provided on a rear surface of the light guide element 7c in such a manner that the microprisms 17 and 18 constitute a continuous pattern, and provided in a region extending from a boundary surface 8 to a halfway point Q between the boundary surface 8 and that end of the light guide section 7c which is closer to the light source 6.

The microprisms 18 serve to break a total reflection condition near the boundary surface 8 to prevent a dark region from emerging near the boundary surface 8. The microprisms 17 serve to diffusely reflect light guided from the light guide section 7c. This allows the light-emitting surface 7a to emit light with an increase in uniformity in luminance.

The plurality of the microprisms 17 and 18 are advantageous since they can be provided in such a way as to vary in distribution density according to an amount of light that is emitted from the light-emitting surface 7a. This makes it possible, for example, to provide a larger number of microprisms 17 and 18 on respective regions where the amounts of light are relatively small, and to provide a smaller number of microprisms 17 and 18 on respective regions where the amounts of light are relatively large. This brings about an effect of further improving the uniformity in luminance of the light-emitting surface 7a.

Embodiment 4

Embodiment 4 of the present invention is described below with reference to FIG. 10. A configuration other than that described in the present embodiment is the same as the configuration described in Embodiment 1. For convenience of explanation, members having the same functions as those shown in the drawings in Embodiment 1 are given the same reference numerals, and as such, are omitted to describe below.

FIG. 10 is a cross-sectional view schematically showing a configuration of a light-emitting unit constituting an illumination device of a liquid crystal display device according to still another embodiment of the present invention.

As shown in FIG. 10, a light guide element 15 constituting a light-emitting unit 1d of the present embodiment includes: a light-emitting unit 15b, which corresponds to the light-emitting section 7b; and a light guide section 15c, which corresponds to the light guide section 7c. The light guide element 15 has diffusing means provided in the light guide section 15c in a way different from the way in which the light guide element 7 has the diffusing means provided in the light guide section 7c.

More specifically, the diffusing means in the light guide element 15 is formed by a reflecting surface 20 for allowing part of light, which is guided in a region extending from boundary surface 19 between the light-emitting section 15b and the light guide section 15c to a halfway point Q between the boundary surface 19 and that end of the light guide section 15c which is closer to a light source 6, to be reflected by a different angle.

In view of such a tandem arrangement of light guide elements 15 that the light guide section 15c of one of the light guide elements 15 is overlapped with the light-emitting section 15b of another one of the light guide elements 15, it is preferable that the reflecting surface 20 be depressed into the light guide section 15c to fit in well with the tandem arrangement.

In the configuration, part of the light emitted from the light source 6 and guided to the halfway point Q is reflected by a different angle by the reflecting surface 20. This makes it possible to generate such a component of the light which can arrive at the light-emitting surface 15b of the light-emitting section 15b at an angle of incidence not larger than the critical angle of total reflection.

Thus, it is possible to realize the light guide element which can suppress a decrease in luminance of surface emission and further improve uniformity in luminance of the light-emitting surface as seen from any angle.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims. Also, an embodiment based on a proper combination of technical means disclosed in various embodiments is encompassed in the technical scope of the present invention.

As described so far, the light guide element of the present invention includes the diffusing means for diffusing incident light incident, the diffusing means being provided in at least part of the region extending from (i) the boundary surface between the light-emitting section and the light guide section to (ii) the halfway point between the boundary surface and that end of the light guide section which is closer to the light source.

As described so far, the illumination device of the present invention includes such a light guide element.

As described so far, the liquid crystal display device of the present invention includes such an illumination device as a backlight.

Therefore, it is possible to realize: the light guide element for allowing the dot-like light source to produce surface emission, which can suppress a decrease in luminance of the surface emission and further improve uniformity in luminance of the light-emitting surface as seen from any angle; the illumination device including such a light guide element; and the liquid crystal display device including such an illumination device and thereby having improved display quality.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention can be applicable to: a light guide element for allowing a dot-like light source to produce surface emission; an illumination device including such a light guide element; and a liquid crystal display device including such an illumination device.

The invention claimed is:

1. A light guide element comprising:
   a light-emitting section including a light-emitting surface by which to perform surface emission of light coming from a light source having a shape similar to a dot;
   a light guide section arranged to guide the light coming from the light source to the light-emitting section, the light guide section being configured so that a light-emitting section of another light guide element is placed on the light guide section; and
   a diffusing device arranged to diffuse incident light, the diffusing device being provided in the light guide section only within a region extending from (i) a boundary between the light-emitting section and the light guide section to (ii) a point halfway between the boundary and that end of the light guide section which is closer to the light source; wherein
   the light guide element has a thickness direction perpendicular to a plane of extension of a substrate on which the light source is provided and a length direction orthogonal to the thickness direction of the light guide element and extending from the light guide section to the light-emitting section;
   a first plane passing through the halfway point perpendicularly to the length direction, the region is represented by Z falling within a range of:

$0 < Z \leq (h \times \tan \Phi)/(1-(\tan \Phi \times \tan \theta))$, where Z is a distance from the boundary to the first plane; θ is an angle of inclination formed between the plane of extension of the substrate and a rear surface of the light guide section, the rear surface of the light guide section continuing into a rear surface of the light-emitting section opposite the light-emitting surface; Φ is a total reflection critical angle of the light guide element, and h is a thickness of that end of the light guide section which is closer to the light source; and
   the light-emitting surface is constituted by (i) a horizontal surface facing an object to be irradiated and (ii) an inclined surface provided between the horizontal surface and the light guide section and inclined at continuously varying angles to the horizontal surface to define a curved surface at which the inclined surface is connected to the horizontal surface.

2. The light guide element as set forth in claim 1, wherein the diffusing device is a diffusing sheet.

3. The light guide element as set forth in claim 1, wherein the diffusing device is formed by surface roughening.

4. The light guide element as set forth in claim 1, wherein the diffusing device is defined by a reflecting surface arranged to cause light guided in a region extending from the halfway point to the light source to be reflected by a different angle.

5. The light guide element as set forth in claim 1, wherein the diffusing device is further provided in at least a portion of the light-emitting section.

6. The light guide element as set forth in claim 1, wherein the diffusing device extends from the light-emitting section into the light guide section.

7. The light guide element as set forth in claim 6, wherein the diffusing device is provided with a varying distribution density to provide a uniform light output from the light-emitting surface.

8. An illumination device comprising a light guide element as set forth in claim 1.

9. A liquid crystal display device comprising, as a backlight, an illumination device as set forth in claim 8.

10. The light guide element as set forth in claim 1, wherein:
    the light guide element has a thickness direction perpendicular to a plane of extension of a substrate on which the light source is provided and a length direction orthogonal to the thickness direction of the light guide element and extending from the light guide section to the light-emitting section; and
    the boundary has a boundary plane perpendicular to the length direction of the light guide element, the light guide section between the light-emitting section and the light source has a length set so that a beam of light emitted from the light source and spreading radially within the light guide element has a cross-section equal in area to or larger in area than the boundary plane when the beam of light arrives at the boundary plane.

11. The light guide element as set forth in claim 10, wherein:

$X < Y$, where X is a length of the light guide section along the length direction and Y is a length of the light-emitting section along the length direction.

12. The light guide element as set forth in claim 11, wherein:
    the light guide element has a width direction intersecting with the length direction;
    the light source comprises one light source provided in a central portion of the light guide element along the width direction, X falls within a range of:

$$X \geq \frac{L1 \times n \sqrt{\{1-(1/n^2)\}}}{2},$$

where L1 is a length of the light guide along the width direction and n is a refractive index of the light guide element.

13. The light guide element as set forth in claim 11, wherein:
    the light guide element has a width direction intersecting with the length direction;
    the light source comprises an array of plural light sources, provided in a central part of the light guide element along the width direction, which emit different colors of light, X falls within a range of:

$$X \geq \frac{(L1+L2)n\sqrt{\{1-(1/n^2)\}}}{2},$$

where L1 is a length of the light guide element along the width direction, L2 is a distance between two light sources placed at respective ends of the array, and n is a refractive index of the light guide element.

* * * * *